(12) United States Patent
Moon et al.

(10) Patent No.: US 10,361,456 B2
(45) Date of Patent: Jul. 23, 2019

(54) ELECTROLYTE, METHOD OF PREPARING THE ELECTROLYTE, AND SECONDARY BATTERY INCLUDING THE ELECTROLYTE

(71) Applicant: Samsung Electronics Co., Ltd., Suwon-si, Gyeonggi-do (KR)

(72) Inventors: Junhyuk Moon, Daejeon (KR); Myungjin Lee, Seoul (KR); Wonseok Chang, Seoul (KR); Hyorang Kang, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 733 days.

(21) Appl. No.: 14/820,070

(22) Filed: Aug. 6, 2015

(65) Prior Publication Data

US 2016/0093916 A1    Mar. 31, 2016

(30) Foreign Application Priority Data

Sep. 26, 2014  (KR) .................. 10-2014-0129514
Apr. 28, 2015  (KR) .................. 10-2015-0060088

(51) Int. Cl.
*H01M 10/0565* (2010.01)
*H01M 10/0525* (2010.01)
*H01M 10/052* (2010.01)

(52) U.S. Cl.
CPC ..... *H01M 10/0565* (2013.01); *H01M 10/052* (2013.01); *H01M 10/0525* (2013.01); *H01M 2300/0082* (2013.01)

(58) Field of Classification Search
CPC .......... H01M 10/052; H01M 10/0525; H01M 10/0565; H01M 2300/0082
See application file for complete search history.

(56) References Cited

U.S. PATENT DOCUMENTS

| | | |
|---|---|---|
| 4,357,215 A | 11/1982 | Goodenough et al. |
| 6,764,614 B2 | 7/2004 | Penterman et al. |
| 7,513,136 B2 | 4/2009 | Laliberte et al. |
| 7,531,012 B2 | 5/2009 | Sudano et al. |
| 7,547,492 B2 | 6/2009 | Awano et al. |
| 7,838,164 B2 | 11/2010 | Adachi et al. |
| 7,968,224 B2 | 6/2011 | Sudano et al. |
| 8,278,004 B2 | 10/2012 | Adachi et al. |

(Continued)

FOREIGN PATENT DOCUMENTS

| | | |
|---|---|---|
| CN | 102725316 A | 10/2012 |
| CN | 103827158 A | 5/2014 |

(Continued)

OTHER PUBLICATIONS

Hirahara et al., Japan Platform for Patent Information, machine translation for JP 2000-285751 A (Year: 2000).*

(Continued)

*Primary Examiner* — Barbara L Gilliam
*Assistant Examiner* — Adam A Arciero
(74) *Attorney, Agent, or Firm* — Cantor Colburn LLP

(57) ABSTRACT

An electrolyte including a block copolymer containing a co-continuous domain including an ion conductive phase and a structural phase, wherein the structural phase includes a polymer segment having a glass transition temperature that is equal to or lower than room temperature.

17 Claims, 16 Drawing Sheets

(56) References Cited

U.S. PATENT DOCUMENTS

| | | | |
|---|---|---|---|
| 8,420,704 | B2 | 4/2013 | Hillmyer et al. |
| 9,512,247 | B2 | 12/2016 | Ikari et al. |
| 9,979,048 | B2 | 5/2018 | Lee et al. |
| 2007/0054184 | A1* | 3/2007 | Yong .................... H01M 2/145 429/144 |
| 2009/0075176 | A1* | 3/2009 | Singh .................... H01B 1/122 429/309 |
| 2009/0263725 | A1 | 10/2009 | Balsara et al. |
| 2010/0073605 | A1 | 3/2010 | Masutani et al. |
| 2010/0209782 | A1* | 8/2010 | Choi .................... H01M 4/0452 429/332 |
| 2011/0206994 | A1 | 8/2011 | Balsara et al. |
| 2011/0281173 | A1 | 11/2011 | Singh et al. |
| 2012/0178835 | A1* | 7/2012 | Findlay ................ B01D 67/002 521/27 |
| 2014/0039373 | A1 | 2/2014 | Ragusa et al. |
| 2014/0049296 | A1 | 2/2014 | Jeon et al. |
| 2016/0008769 | A1* | 1/2016 | Dubois ................ B01D 69/125 210/500.27 |
| 2016/0013515 | A1 | 1/2016 | Lee et al. |
| 2016/0064770 | A1 | 3/2016 | Lee et al. |
| 2016/0064772 | A1 | 3/2016 | Choi et al. |
| 2016/0072148 | A1 | 3/2016 | Lee et al. |
| 2016/0079625 | A1 | 3/2016 | Shon et al. |
| 2016/0087306 | A1 | 3/2016 | Lee et al. |
| 2016/0093879 | A1 | 3/2016 | Song et al. |
| 2016/0093916 | A1 | 3/2016 | Moon et al. |

FOREIGN PATENT DOCUMENTS

| | | | |
|---|---|---|---|
| EP | 0068159 A1 | | 1/1983 |
| JP | 2000285751 A | * | 10/2000 |
| JP | 2003-203676 A | | 7/2003 |
| JP | 2009-531820 A | | 9/2009 |
| JP | 2013-505318 A | | 2/2013 |
| KR | 100411235 B1 | | 12/2003 |
| KR | 101455799 B1 | | 10/2014 |

OTHER PUBLICATIONS

Morgan W. Schulze et al. "High-Modulus, High-Conductivity Nanostructured Polymer Electrolyte Membranes via Polymerization-Induced Phase Separation", Nano Letters 2014, 14(1), 122-126.

Myungeun Seo, et al. "Reticulated Nanoporous Polymers by Controlled Polymerization-Induced Microphase Separation", Science 336, 1422 (2012).

Extended Search Report issued by the European Patent Office dated Mar. 4, 2016 w/English Translation.

Yuzo Kitazawa et al. "Gelation of Solvate Ionic Liquid by Self-Assembly of Block Copolymer and Characterization as Polymer Electrolyte", Macromolecules 2014, 47, 6009-6016.

Office Action dated May 10, 2016 issued for the Korean Patent Application No. 10-2015-0060088 (with English translation).

Frank S. Bates et al. "Block Copolymers—Designer Soft Materials", Physics Today 52(2), 32 (1999).

Graeme Moad et al. "Toward Living Radical Polymerization", Accounts of Chemical Research, vol. 41, No. 9, Sep. 2008, 1133-1142.

Jeffrey H. Rosedale et al. "Order and Disorder in Symmetric Diblock Copolymer Melts", Macromolecules 1995, 28, 1429-1443.

Jinli Qiao et al. "Alkaline solid polymer electrolyte membranes based on structurally modified PVA/PVP with improved alkali stability", Polymer 51 (2010) 4850-4859.

M. W. Matsen "Effect of Architecture on the Phase Behavior of AB-Type Block Copolymer Melts", Macromolecules 2012, 45, 2161-2165.

Xianguo Ma et al. "Compliant gel polymer electrolyte based on poly(methyl acrylate-co-acrylonitrile)/poly(vinyl alcohol) for flexibile lithium-ion batteries", Electrochimica Acta 115 (2014) 216-222.

Chiappone et al. "Microfibrillated cellulose as reinforcement for Li-ion battery polymer electrolytes with excellent mechanical stability", Journal of Power Sources 196 (2011) 10280-10288.

Christopher Barner-Kowollik et al. "Synthesis of Star Polymers using RAFT Polymerization: What is Possible?" Aust. J. Chem. 2006, 59, 719-727.

Md. Abu Bin Hasan Susan, et al., "Ion Gels Prepared by in Situ Radical Polymerization of Vinyl Monomers in an Ionic Liquid and Their Characterization as Polymer Electrolytes", J. Am. Chem. Soc. 2005, 127, 4976-4983.

Mohit Singh et al. "Effect of Molecular Weight on the Mechanical and Electrical Properties of Block Copolymer Electrolytes", Macromolecules 2007, 40, 4578-4585.

Morgan W. Schulze et al. "High-Modulus, High-Conductivity Nanostructured Polymer Electrolyte Membranes via Polymerization-Induced Phase Separation", Nano Lett. 2014, 14, 122-126.

Sipei Zhang et al. "Viscoelastic Properties, Ionic Conductivity, and Materials Design Considerations for Poly(styrene-b-ethylene oxide-b-styrene)-Based Ion Gel Electrolytes", Macromolecules 2011, 44, 8981-8989.

William Rodgers Hudson, "Block Copolymer Electrolytes for Lithium Batteries", 2011, 78 pp. Electronic Thesis and Dissertations, UC Berkeley.

Yongku Kang et al. "A study of cross-linked PEO gel polymer electrolytes using bisphenol A ethoxylate diacrylate: ionic conductivity and mechanical properties", Journal of Power Sources 119-121 (2003) 432-437.

Office Action issued by the Chinese Patent Office dated Sep. 5, 2018, in the examination of the Chinese Patent Application No. 201510604491.5 with English Translation.

\* cited by examiner

ELECTROLYTE, METHOD OF PREPARING THE ELECTROLYTE, AND SECONDARY BATTERY INCLUDING THE ELECTROLYTE

CROSS-REFERENCE TO RELATED APPLICATION

This application claims priority to and the benefit of Korean Patent Application Nos. 10-2014-0129514, filed on Sep. 26, 2014, and 10-2015-0060088, filed on Apr. 28, 2015, in the Korean Intellectual Property Office, the disclosure of which is incorporated herein in its entirety by reference.

BACKGROUND

1. Field

The present disclosure relates to an electrolyte, a method of preparing the electrolyte, and a secondary battery including the electrolyte.

2. Description of the Related Art

Lithium secondary batteries are high-performance batteries having the highest energy density among other currently available secondary batteries, which are applicable in various fields such as electrical vehicles. Lithium secondary batteries suitable for electrical vehicles may operate at high temperature, may charge/discharge a large amount of electricity, and may be used for a long period of time.

A known electrolyte used in a lithium secondary battery is a polyethylene oxide (PEO) electrolyte. The electrolyte has an excellent ion conductivity at a temperature of 60° C. or higher, but the ion conductivity of the electrolyte deteriorates at room temperature.

Another example of a known electrolyte may be a polyethylene oxide-polystyrene (PEO-PS) block copolymer electrolyte. However, mechanical properties of the electrolyte are not at a satisfactory level, and need improvement.

SUMMARY

Provided are electrolytes having improved mechanical properties.

Provided are methods of preparing the electrolytes.

Provided are lithium secondary batteries that have improved cycle efficiency and stability by inclusion of any of the electrolytes.

Additional aspects will be set forth in part in the description which follows and, in part, will be apparent from the description, or may be learned by practice of the presented exemplary embodiments.

According to an aspect of an exemplary embodiment, provided is an electrolyte, which is a block copolymer containing a co-continuous domain including an ion conductive phase and a structural phase, wherein the structural phase includes a polymer segment having a glass transition temperature that is equal to or lower than room temperature.

The structural phase may include a polymer, which is a polymerization product of:
i) a monofunctional polymerizable monomer,
ii) a multifunctional polymerizable monomer, and
iii) a polymerizable monomer having a reactive functional group.

According to an aspect of another exemplary embodiment, a method of preparing an electrolyte includes performing polymerization of an electrolyte composition including:

a chain transfer agent containing an ion conductive polymer, which is a polymer for forming an ion conductive phase; and
the electrolyte composition including:
i) a monofunctional polymerizable monomer,
ii) a multifunctional polymerizable monomer, and
iii) a polymerizable monomer having a reactive functional group, which are monomers for forming a structural phase polymer.

According to an aspect of another exemplary embodiment, a lithium secondary battery includes:
a cathode,
an anode, and
the electrolyte disposed between the cathode and the anode.

BRIEF DESCRIPTION OF THE DRAWINGS

These and/or other aspects will become apparent and more readily appreciated from the following description of the exemplary embodiments, taken in conjunction with the accompanying drawings in which.

Figure 7:
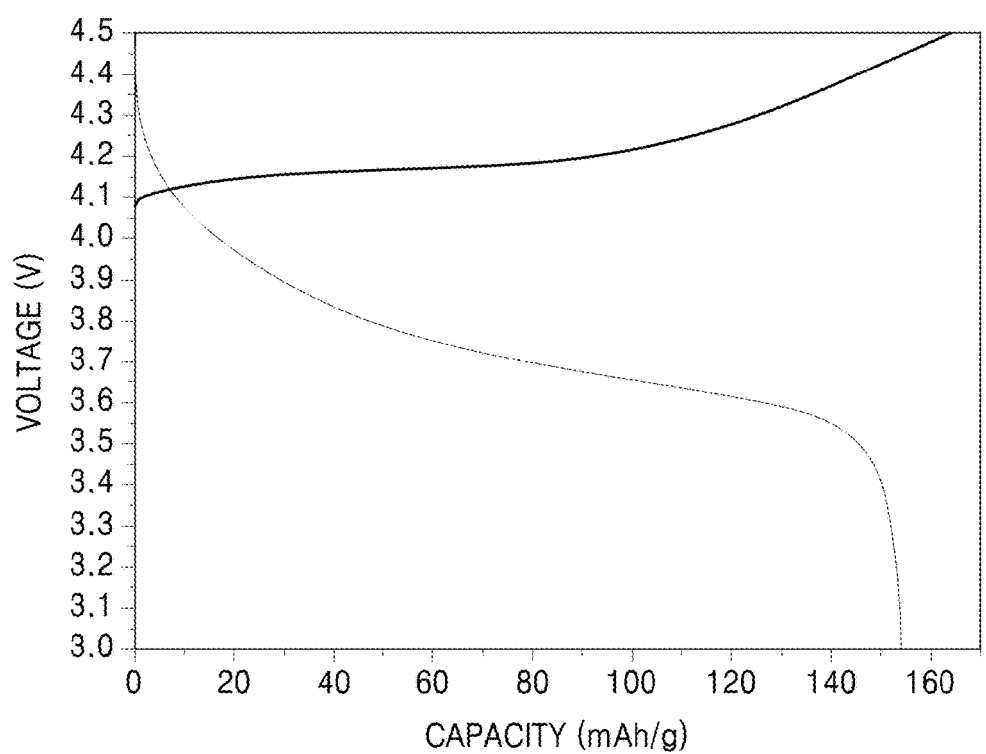
Figure 8:
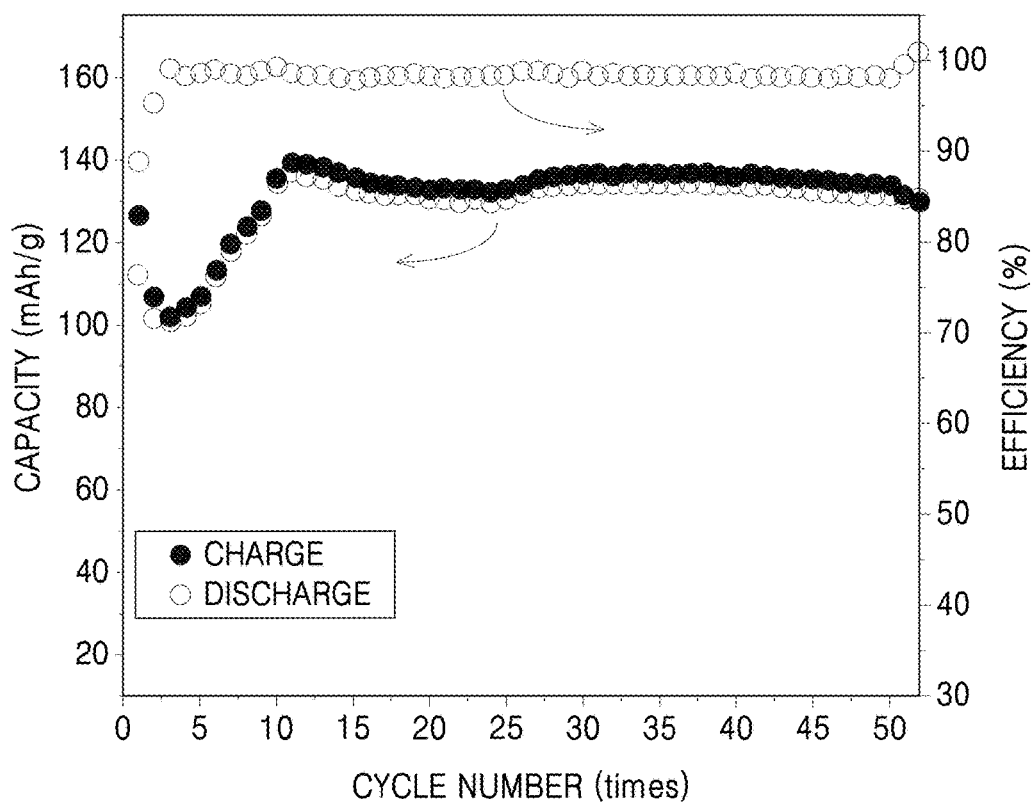
Figure 9:
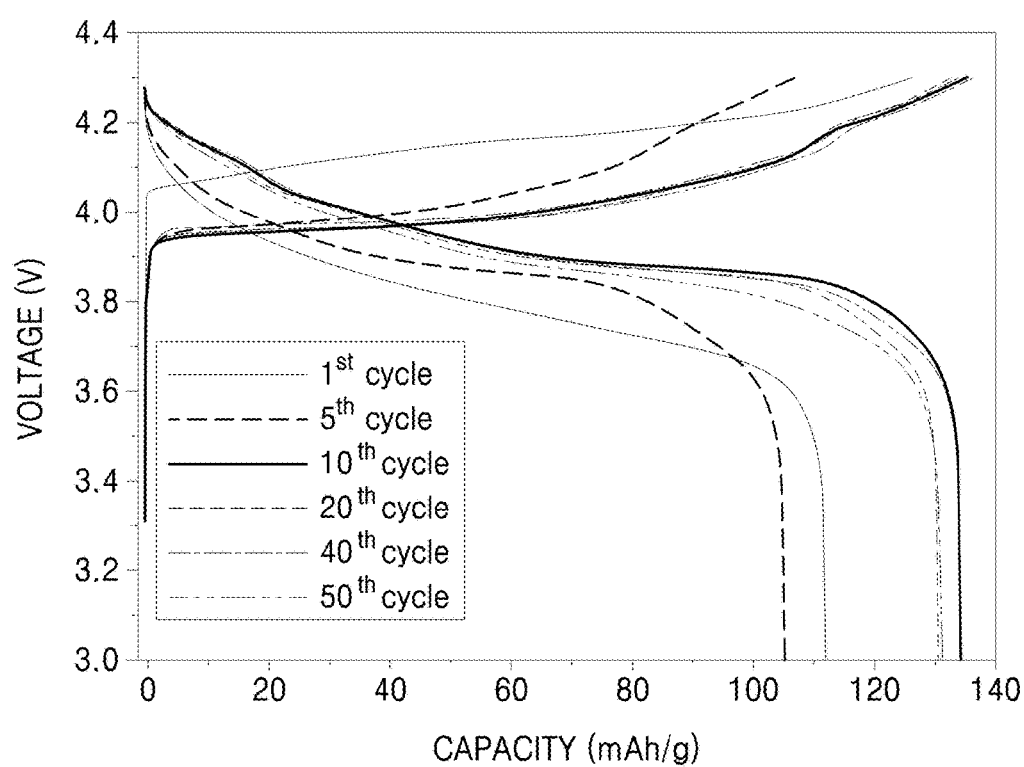
Figure 10:
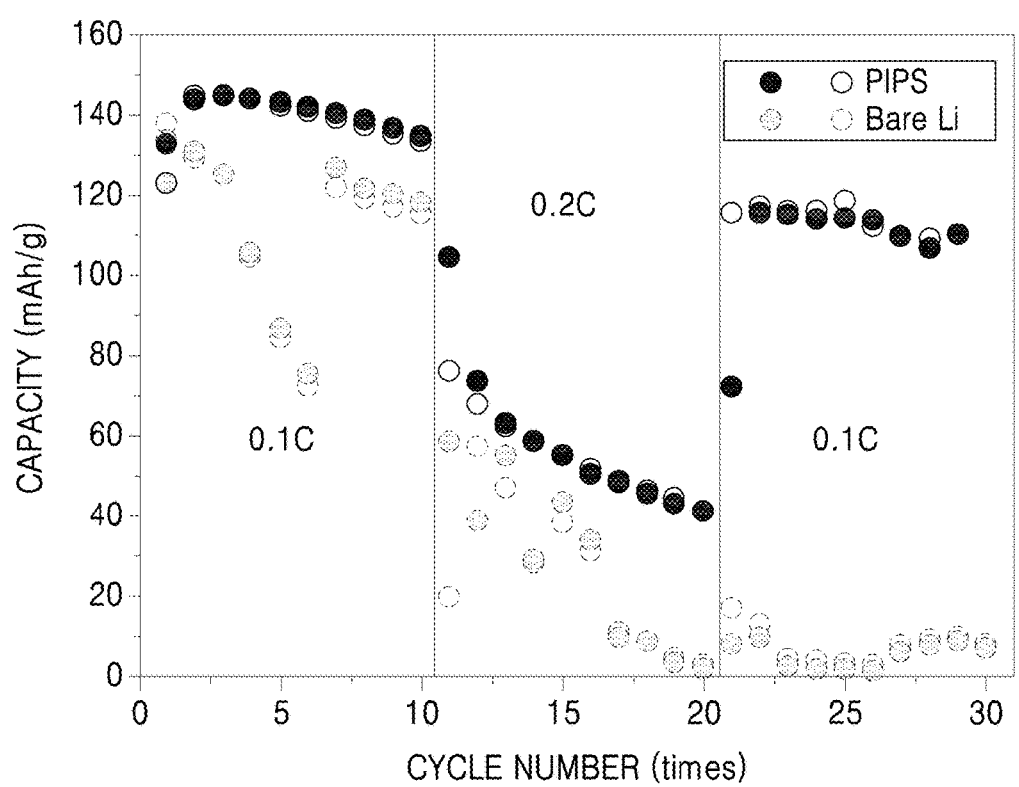

FIG. 7 is a graph of voltage (Volts, V) versus capacity (milliAmpere hours per gram, mA-h/g) showing charging/discharging characteristics of the coin cell prepared in Manufacture Example 2;

FIG. 8 is a graph of capacity (milliAmpere hours per gram, mA-h/g) and efficiency (percent, %) versus cycle number (times) showing a capacity change with respect to a lithium secondary battery prepared in Manufacture Example 8;

FIG. 9 is a graph of voltage (Volts, V) versus capacity (milliAmpere hours per gram, mA-h/g) showing a voltage change according to a capacity with respect to the lithium secondary battery prepared in Manufacture Example 8; and FIG. 10 of capacity (milliAmpere hours per gram, mA-h/g) versus cycle number (times) showing a capacity change in lithium secondary batteries prepared with respect to Manufacture Example 9 and Comparative Manufacture Example 4.

DETAILED DESCRIPTION

Reference will now be made in detail to exemplary embodiments of an electrolyte, a method of preparing the electrolyte, and a secondary battery including the electrolyte, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or includes any and all combinations of one or more of the associated listed items. Expressions such as at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or features relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In all of the chemical formulae disclosed herein, the term "substituted" used with the alkylene group, the alkyl group, the alkoxy group, the alkenyl group, the alkenylene group, the alkynyl group, the alkynylene group, the arylene group, the aryl group, the aryloxy group, the arylalkyl group, the heteroaryl group, the heteroaryloxy group, the heteroarylalkyl group, the heterocyclic group, the heterocyclic alkyl group, the carbocyclic group, or the carbocyclic alkyl group refers to a halogen atom or a C1-C20 alkyl group substituted with a halogen atom (e.g., $CF_3$, $CHF_2$, $CH_2F$, or $CCl_3$), a hydroxyl group, a nitro group, a cyano group, an amino group, an amidino group, a hydrazine group, a hydrazone group, a carboxyl group or a salt thereof, a sulfonic acid group or a salt thereof, a phosphoric acid group or a salt thereof, or a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, or a $C_6$-$C_{20}$ heteroarylalkyl group.

The term "alkyl group" as used herein in a chemical formula refers to a monovalent fully saturated branched or unbranched (or straight chain or linear) hydrocarbon group. Examples of the term "alkyl group" used in the chemical formula are methyl, ethyl, propyl, isobutyl, sec-butyl, tert-butyl, neo-butyl, iso-amyl, and hexyl group.

The term "heteroalkyl group" as used herein in a chemical formula refers to an alkyl group as defined above in which at least one carbon atom is replaced with a heteroatom selected from nitrogen (N), oxygen (O), phosphorus (P), or sulfur (S) and having carbon as remaining cyclic atoms. Examples of the term "heteroalkyl group" used in the chemical formula are methylthio, methoxymethyl, dimethylamino group, and the like.

The term "alkoxy group" as used herein in a chemical formula refers to alkyl-O—, wherein the alkyl group is as described above. Examples of the term "alkoxy group" used in the chemical formula are methoxy, ethoxy, propoxy group, and the like.

The term "alkylthio group" as used herein in a chemical formula refers to alkyl-S—, wherein the alkyl group is as described above. Examples of the term "alkylthio group" used in the chemical formula are methylthio, ethylthio, propylthio group, and the like.

The term "dialkylamino group" as used herein in a chemical formula refers to (alkyl)$_2$N—, wherein the alkyl group is as described above. Examples of the term "dialkylamino group" used in the chemical formula are dimethylamino, diethylamino, methylethylamino group, and the like.

The term "alkenyl group" as used herein in a chemical formula refers to a hydrocarbon group containing at least one carbon-carbon double bond. Examples of the term "alkenyl group" used in the chemical formula are ethenyl, propenyl, and iso-butenyl.

The term "aryl group" as used herein in a chemical formula, which is used alone or in combination, indicates a monovalent aromatic system including at least one ring. Examples of the term "aryl group" used in the chemical formula are phenyl, naphthyl, tetrahydronaphthyl group, and the like.

The term "arylalkyl group" as used herein in a chemical formula refers to an alkyl group substituted with an aryl group. Detailed examples of the term "arylalkyl group" used in the chemical formula are phenylmethyl, phenylethyl, naphthylmethyl, naphthylethyl, tetrahydronaphthylmethyl, tetrahydronaphthylethyl group, and the like.

The term "aryloxy group" as used herein in a chemical formula refers to aryl-O—, wherein the aryl group is as described above. Examples of the term "aryloxy group" used in the chemical formula are phenoxy, naphthyloxy, tetrahydronaphthyloxy group, and the like.

The term "arylthio group" as used herein in a chemical formula refers to aryl-S—, wherein the aryl group is as described above. Examples of the term "arylthio group" used in the chemical formula are phenylthio, naphthylthio, tetrahydronaphthylthio group, and the like.

The term "heteroaryl group" as used in a chemical formula refers to a monovalent group derived from an organic compound having at least one heteroatom selected from N, O, P, and S and having carbon as remaining cyclic atoms. Detailed examples of the term "heteroarylene group" used in the chemical formula are pyridyl group and the like.

The term "heteroarylalkyl group" used in a chemical formula refers to an alkyl group substituted with a heteroaryl group. Detailed examples of the term "heteroarylalkyl group" used in the Formulae above are 2-pyridylmethyl and the like.

The term "heteroarylalkoxy group" as used herein in a chemical formula refers to heteroarylalkyl-O moiety. Detailed examples of the term "heteroarylalkoxy group" used in the chemical formula are 2-pyridylmethyloxy and the like.

The term "heteroaryloxy group" as used in a chemical formula refers to an heteroaryl-O moiety. Detailed examples of the term "heteroaryloxy group" used in the chemical formula are 2-pyridyloxy and the like.

The term "heteroarylthio group" as used in a chemical formula refers to an heteroaryl-S moiety. Detailed examples of the term "heteroarylthio group" used in the chemical formula are 2-pyridylthio and the like.

The term "saturated carbocyclic group" used in a chemical formula refers to a saturated non-aromatic monocyclic, bicyclic, or tricyclic hydrocarbon group. Detailed examples of the term "saturated carbocyclic group" used in the chemical formula are cyclohexyl and the like.

The term "unsaturated carbocyclic group" used in a chemical formula refers to a partially unsaturated non-aromatic monocyclic, bicyclic, or tricyclic hydrocarbon group. Detailed examples of the term "unsaturated carbocyclic group" used in the chemical formula are cyclohexenyl and the like.

The term "aromatic carbocyclic group" used in a chemical formula refers to a bicyclic, tricyclic, or polycyclic hydrocarbon group in which one or more rings are aromatic and at least one ring is non-aromatic. Detailed examples of the term "aromatic carbocyclic group" used in the chemical formula are 1,2,3,4-tetrahydronaphthalenyl and the like.

The term "heterocyclic group" used in a chemical formula refers to a saturated or unsaturated carbocyclic group as defined above in which at least one carbon atom is replaced with a heteroatom selected from nitrogen (N), oxygen (O), phosphorus (P), or sulfur (S) and having carbon as remaining cyclic atoms. Detailed examples of the term "heterocyclic group" used in the chemical formula are 3-tetrahydrofuranylmethyl and the like.

According to an embodiment of the present disclosure, an electrolyte is a block copolymer containing a co-continuous domain including:
  an ion conductive phase and
  a structural phase,
  wherein the structural phase includes a polymer segment having a glass transition temperature that is equal to or lower than room temperature.

The structural phase includes a polymer as a polymerization product of:
  i) a monofunctional polymerizable monomer,
  ii) a multifunctional polymerizable monomer, and
  iii) a polymerizable monomer having a reactive functional group.

The term "room temperature" used herein denotes about 25° C.

The polymer segment having a glass transition temperature that is equal to or lower than room temperature is derived from the polymerizable monomer having the reactive functional group. For example, the polymer segment having a glass transition temperature is obtained by polymerizing the polymerizable monomer having the reactive functional group with the monofunctional polymerizable monomer and the multifunctional polymerizable monomer. Here, the polymerization includes copolymerization, cross-linking, and/or grafting the polymerizable monomer having a reactive functional group with the monofunctional polymerizable monomer and the multifunctional polymerizable monomer.

The structural phase includes a polymer including a polymer segment having a high glass transition temperature (Tg) and a polymer segment having a low glass transition temperature (Tg). The high glass transition temperature refers to a glass transition temperature that is higher than room temperature which is for example in a range of about 30° C. to about 300° C. The term "polymer segment" used herein denotes a partial chain forming a polymer.

In general, a structural phase of a block copolymer used in preparation of an electrolyte is formed of a polymer segment having a high glass transition temperature alone to have excellent mechanical properties. Here, the high glass transition temperature refers to a glass transition temperature higher than room temperature (about 25° C.).

However, in the electrode according to an embodiment, the structural phase forming the block copolymer includes, the polymer segment having a low glass transition temperature in addition to the polymer segment having a high glass transition temperature, wherein, in particular, the low glass transition temperature is a glass transition temperature that is equal to or lowers than room temperature. The glass transition temperature that is equal to or lower than room temperature refers to a glass transition temperature in a range of, for example, about −50° C. to about 25° C. When an electrolyte contains a polymer segment having the glass transition temperature that is equal to or lower than room temperature, a structural phase polymer and a block copolymer containing the structural phase polymer may have excellent elastic characteristics. Elasticity of a polymer for forming a structural phase having excellent elasticity is obtained by reacting the polymerizable monomer having a reactive functional group with the monofunctional polymerizable monomer and the multifunctional polymerizable monomer.

In the structural phase, an amount of the polymer segment having a low glass transition temperature (Tg) in the polymer including the polymer segment having a high glass transition temperature (Tg) and a polymer segment having the low glass transition temperature (Tg) may be, for example, in a range of about 0.2 moles (mol) to about 0.7 mol based on 1 mol of the polymer for forming the structural phase (the total amount of the polymer segment having a high glass transition temperature and the polymer segment having a low glass transition temperature).

The term "polymerization product" used herein denotes a product of polymerization, crosslinking, or grafting, and, for example, the polymerization product may denote a crosslinked copolymerization product having:

i) a monofunctional polymerizable monomer,
ii) a multifunctional polymerizable monomer, and
iii) an elasticity-retaining polymerizable monomer having a reactive functional group.

The crosslinked copolymerization product is a product obtained from crosslinking copolymerization and/or a product obtained from graft copolymerization.

A size of the co-continuous domain is about 1 micrometers (μm) or greater.

A polyethylene oxide-polystyrene block copolymer electrolyte is a known electrolyte for a lithium secondary battery. In the electrolyte, an ion conductive phase includes a polyethylene oxide, and the structural phase includes polystyrene having a high glass transition temperature by itself. However, although an ion conductivity of the electrolyte is good at room temperature, mechanical properties of the electrolyte are not sufficient, and thus short-circuits may occur in a battery due to cracks occurred during operation of the battery. Also, when the electrolyte is used as a lithium anode protective layer, an effect of suppressing dendrites formation of lithium metal is insignificant, and thus there is a need for the electrolyte improvement.

In this regard, the present inventors use a block copolymer having a structure containing a co-continuous domain including an ion conductive phase and a structural phase as a polymer for forming an electrolyte, wherein a size of the co-continuous domain is controlled to be about 1 μm or greater compared to that of a conventional co-continuous domain. At the same time, a composition of the polymer forming the structural phase of the block copolymer can be varied to control elasticity of the block copolymer. Here, the composition of the polymer forming the structural phase may be varied by changing kinds and amounts of monomers that are used as starting materials for preparing the polymer.

According to an embodiment, a monofunctional polymerizable monomer, a multifunctional polymerizable monomer, and an elasticity-retaining polymerizable monomer having a reactive functional group are used as monomers.

A block copolymer having a size of the co-continuous domain may be obtained by a reversible addition-fragmentation chain transfer (RAFT) reaction. A chain transfer agent may be used in the RAFT reaction. In this regard, when the chain transfer agent is used to perform the RAFT reaction, a block copolymer may have a low polydispersity and an extended chain length. Also, since the block copolymer has integrity by inclusion of a crosslinked network phase, which is crosslinked as a polymerization product from polymerization (crosslinked copolymerization) of the monofunctional polymerizable monomer, the multifunctional polymerizable monomer, and the elasticity-retaining polymerizable monomer having a reactive functional group, the block copolymer may simultaneously retain elasticity as well. Here, the crosslinked copolymerization may include graft copolymerization.

According to an embodiment, a polydispersity (a weight average molecular weight (Mw)/a number average molecular weight (Mn)) of the block copolymer is about 3.0 or lower, for example, in a range of about 1.0 to about 2.0, or, in particular, about 1.05 to about 1.17. Also, a weight average molecular weight of the block copolymer may be in a range of about 10,000 Daltons (Da) to about 200,000 Daltons, or, for example, about 40,000 Daltons to about 150,000 Daltons.

When an electrolyte includes the block copolymer, the electrolyte may have excellent ion conductivity and improved mechanical properties as percolation of nanochannels takes place in which ions, such as lithium ions, may move fast. Since the mechanical properties of the electrolyte improve, formation of cracks which may occur during a charging/discharging process of a battery may be prevented. Also, when the electrolyte is used as an anode protective layer, an effect of suppressing formation of lithium metal dendrites is excellent. Thus, short-circuits in the battery caused by the deterioration of the mechanical properties of the electrolyte may be prevented.

For example, the mechanical properties used herein refer to characteristics that represent mechanical strength such as a modulus of elasticity or tensile strength.

The term "ion conductive phase" as used herein refers to a region that is mainly responsible for electrical performance (e.g., ion conductivity) of a block copolymer. Also, the term "structural phase" as used herein refers to a region that is mainly responsible for mechanical properties, durability, and thermal stability of the block copolymer. The co-continuous domain including the ion conductive phase and the structural phase substantially has continuous phases and does not have a domain boundary. The fact that the co-continuous domain does not have a domain boundary may be confirmed using scanning electron microscopy or by measuring gas sorption isotherm.

A size of the co-continuous domain is about 1 μm or greater. For example, a size of the co-continuous domain may be in a range of about 1 μm to about 1,000 μm, for example, about 1 μm to about 100 μm. A size of the co-continuous domain within these ranges may be confirmed by using a scanning electron microscopy or a transmission electron microscopy, or by measuring a specific surface area of internal pores from a gas sorption isotherm after removing the material in one domain. As described above, while not wishing to be bound by theory, it is understood that when a size of the co-continuous domain is equal to or greater than about 1 μm, excellent ion conductivity and mechanical properties may be simultaneously secured compared to the embodiment when a size of the co-continuous domain is less than about 1 μm. Also, a size of a cross-sectional surface of the channel may be in a range of about 1 nanometer (nm) to about 20 nm. In this regard, a size of the co-continuous domain, a length of the channel, and a size of a cross-sectional surface of the channel may be confirmed by using a scanning electron microscopy, a transmission electron microscopy, or a gas sorption isotherm.

A length and a size of a cross-sectional surface of the channel may be controlled by varying a length of a chain of the polymer forming the ion conductive phase. Here, a size of a cross-sectional surface refers to a length of the longest side or a diameter of the cross-sectional surface.

A structural phase according to an embodiment includes a polymer which is a polymerization product of a monofunctional polymerizable monomer, a multifunctional polymerizable monomer, and a polymerizable monomer having an elasticity-retaining reactive functional group. The polymer contains a polymer segment having a glass transition temperature that is equal to or lower than room temperature and a polymer segment having a glass transition temperature that is higher than room temperature. While not wishing to be bound by theory, it is understood that when the polymer for forming a structural phase contains the polymer segment having a glass transition temperature that is equal to or lower than room temperature, the polymer exhibits rubber characteristics. As a result, when an electrolyte includes the polymer for forming a structural phase, the electrolyte may have excellent elasticity. Also, the polymer for forming a structural phase contains the polymer segment having a glass transition temperature that is higher than room temperature, and thus the electrolyte including the polymer may have glass characteristics at room temperature. It is also understood that when an electrolyte includes the polymer for forming a structural phase, mechanical properties of the electrolyte may be excellent.

The polymerizable monomer having a reactive functional group has a copolymerizable functional group and a reactive functional group, and thus the polymer for forming a structural phase using the polymerizable monomer may have excellent elasticity. In the polymer forming a structural phase, the polymer segment having a glass transition temperature that is equal to or lower than room temperature is closely related to excellent elasticity.

Here, the reactive functional group may be any functional group that is capable of crosslinking and/or graft polymerization. For example, at least one selected from a functional group containing a carbon-carbon double bond (an ethylenically unsaturated bond), a hydroxyl group, an amino group, an amide group, a carboxyl group, and an aldehyde group may be the reactive functional group.

According to an embodiment, the elasticity-retaining polymerizable monomer having a reactive functional group is at least one selected from an acryl monomer having a reactive functional group, a methacryl monomer having a reactive functional group, and an olefin monomer having a reactive functional group. Examples of the elasticity-retaining polymerizable monomer having a reactive functional group may include at least one selected from butyl acrylate, 1,6-hexadiene, 1,4-butadiene, a compound represented by Formula 10a below, Formula 10a

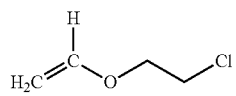

2-hydroxyethyl(meth)acrylate, 2-hydroxypropyl(meth) acrylate, 4-hydroxybutyl(meth)acrylate, 6-hydroxyhexyl (meth)acrylate, 8-hydroxyoctyl(meth)acrylate, 2-hydroxyethyleneglycol(meth)acrylate, 2-hydroxypropyleneglycol (meth)acrylate, acrylic acid, methacrylic acid, 2-(meth) acryloyloxy acetic acid, 3-(meth)acryloyloxy propionic acid, 4-(meth)acryloyloxy butyric acid, itaconic acid, maleic acid, 2-isocyanatoethyl(meth)acrylate, 3-isocyanatopropyl (meth)acrylate, 4-isocyanatobutyl(meth)acrylate, (meth) acrylamide, N-vinylpyrrolidone, ethylene di(meth)acrylate, diethyleneglycol(meth)acrylate, triethyleneglycol di(meth) acrylate, trimethylenepropanetri(meth)acrylate, trimethylenepropanetriacrylate, 1,3-butanediol(meth)acrylate, 1,6-hexanediol di(meth)acrylate, allylacrylate, and N-vinyl caprolactam.

The monofunctional polymerizable monomer denotes a compound having one (co)-polymerizable functional group (e.g., C=C). For example, the monofunctional polymerizable monomer may be at least one selected from styrene, 4-bromostyrene, tert-butylstyrene, methylmethacrylate, isobutylmethacrylate, 4-methylpentene-1, butylene terephthalate, ethylene terephthalate, ethylene, propylene, isobutylmethacrylate, butadiene, dimethylsiloxane, isobutylene, vinylidene fluoride, acrylonitrile, 1-butylvinylether, vinyl cyclohexane, fluorocarbon, cyclohexylmethacrylate, maleic anhydride, maleic acid, methacrylic acid, and vinylpyridine.

The multifunctional polymerizable monomer denotes a compound having at least two reactive functional groups, e.g., (co)polymerizable functional groups. For example, the multifunctional polymerizable monomer may be at least one selected from 1,2-divinylbenzene, 1,3-divinylbenzene, 1,4-divinylbenzene 1,2,4-trivinylbenzene, 4,4''-divinyl-5'-(4-vinylphenyl)-1,1':3',1''-terphenyl, 1,3-divinylnaphthalene, 1,8-divinylnaphthalene, 1,3,5-trivinylnaphthalene, 2,4-divinylbiphenyl, 3,5,7-trivinylnaphthalene, 1,2-divinyl-3,4-dimethylbenzene, 1,5,6-trivinyl-3,7-diethylnaphthalene, 1,3-divinyl-4,5-8-tributylnaphthalene, and 2,2'-divinyl-4-ethyl-4'-propylbiphenyl.

According to an embodiment, the monofunctional polymerizable monomer is styrene, the multifunctional polymerizable monomer is 1,4-divinylbenzene, and the polymerizable monomer having a reactive functional group is butyl acetate, 1,4-hexadiene, or 1,6-hexadiene. In the electrolyte, an amount of the polymerizable monomer having a reactive functional group may be in a range of about 0.2 mol to about 0.7 mol, for example, about 0.4 mol to about 0.6667 mol based on 1 mol of the total amount of the monofunctional polymerizable monomer, the multifunctional polymerizable monomer, and the elasticity-remaining polymerizable monomer having a reactive functional group. Also, an amount of the monofunctional polymerizable monomer may be in a range of about 0.15 mol to about 0.5 mol, for example, about 0.16665 mol to about 0.44445 mol based on 1 mol of the total amount of the monofunctional polymerizable monomer, the multifunctional polymerizable monomer, and the elasticity-remaining polymerizable monomer having a reactive functional group. Also, an amount of the multifunctional polymerizable monomer may be in a range of about 0.05 mol to about 0.3 mol, for example, about 0.1111 mol to about 0.2 mol based on 1 mol of the total amount of the monofunctional polymerizable monomer, the multifunctional polymerizable monomer, and the elasticity-remaining polymerizable monomer having a reactive functional group.

While not wishing to be bound by theory, it is understood that when amounts of the monomers as starting materials for forming the structural phase are within these ranges above, the electrolyte has excellent tensile strength and modulus of elasticity, and thus mechanical properties and ion conductivity of the electrolyte may be excellent, as well as short-circuits occurring in the battery may be prevented.

According to an embodiment, a molar ratio of the monofunctional polymerizable monomer, the multifunctional polymerizable monomer, and the polymerizable monomer having a reactive functional group is 4:1:4, 2:1:2, 1:1:4, or 2:1:4.

The ion conductive phase includes an ion conductive polymer containing at least one ion conductive repeating unit selected from an ether monomer, an acryl monomer, a methacryl monomer, an amine monomer, an imide monomer, an alkylcarbonate monomer, a nitrile monomer, a phosphazene monomer, an olefin monomer, a diene monomer, and a siloxane monomer.

The ion conductive repeating unit is a region that is responsible for an ion conductivity of a block copolymer, and non-limiting examples of the ion conductive repeating unit may be derived from at least one monomer selected from acrylic acid, methacrylic acid, methyl acrylate, methylmethacrylate, ethyl acrylate, ethyl methacrylate, 2-ethylhexyl acrylate, butyl methacrylate, 2-ethyl hexyl methacrylate, decyl acrylate, ethylene vinylacetate, ethylene oxide, and propylene oxide. The ion conductive repeating unit may be ethoxylated trimethylolpropane triacrylate (ETPTA).

The ion conductive polymer may be, for example, at least one selected from polyethyleneoxide, polypropyleneoxide, polymethylmethacrylate, polyethylmethacrylate, polydimethylsiloxane, polyacrylic acid, polymethacrylic acid, polymethylacrylate, polyethylacrylate, poly-2-ethylhexyl acrylate, polybutyl methacrylate, poly-2-ethylhexylmethacrylate, polydecylacrylate, polyethylenevinylacetate, polyimide, polyamine, polyamide, polyalkylcarbonate, polynitrile, polyphosphazines, polyolefin, and polydiene.

An amount of the structural phase may be about 50% or more, or, for example, about 50% to about 90%, or about 50% to about 70%, based on the total volume of the electrolyte. While not wishing to be bound by theory, it is understood that when an amount of the structural phase in the electrolyte is within this range above, mechanical properties of the electrolyte are excellent. The electrolyte may further include an ionic liquid.

The ionic liquid refers to a salt in the liquid phase or a molten salt which is a liquid at room temperature (25° C.), which has a melting point of equal to or lower than room temperature, and is formed of ions only. The ionic liquid includes at least one selected from compounds, each of the compounds including:

i) at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and a combination thereof; and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $SO_4^{2-}$, $PF_6^-$, $ClO_4^-$, $CF_3SO_3^-$, $(C_2F_6SO_2)_2N^-$, and $(C_2F_5SO_2)(CF_3SO_2)N^-$.

The ionic liquid is at least one selected from N-methyl-N-propylpyrrolidinium bis(trifluoromethanesulfonyl)imide [$PYR13^+TFSI^-$], N-butyl-N-methylpyrrolidinium bis(trifluoromethanesulfonyl)imide [$PYR14^+TFSI^-$], 1-butyl-3-methylimidazolium bis(trifluoromethylsulfonyl)imide, 1-butyl-3-methylimidazolium bis(trifluoromethanesulfonyl)imide [BMITFSI], and 1-ethyl-3-methylimidazolium bis(trifluoromethylsulfonyl)imide.

The electrolyte further includes an alkali metal salt or an alkali earth metal salt. In this regard, when the electrolyte further includes an alkali metal salt or an alkali earth metal salt, an ion conductivity of the electrolyte may further improve. Here, examples of the alkali metal salt or the alkali earth metal salt may include a chloride, a hydride, a nitride, a phosphide, a sulfonamide, a triflate, a thiocyanate, a perchlorate, a borate, or a selenide containing an alkali metal or an alkali earth metal. Examples of the alkali metal or the alkali earth metal may include lithium, sodium, potassium, barium, and calcium.

Examples of the alkali metal salt may include at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, $LiN(SO_2CF_3)_2$, $LiN(SO_2CF_2CF_3)_2$, $LiN(CF_3SO_2)_2$, $LiPF_3(C_2F_3)_3$, $LiPF_3(C_2F_5)_3$, $LiPF_3(CF_3)_3$, $LiB(C_2O_4)_2$, NaSCN, $NaSO_3CF_3$, KTFSI, NaTFSI, $Ba(TFSI)_2$, $Pb(TFSI)_2$, $Ca(TFSI)_2$, and $LiPF_3(CF_2CF_3)_3$.

When the electrolyte includes an ionic liquid and a lithium salt, a molar ratio of the ionic liquid/lithium ions (IL/Li) may be in a range of about 0.1 to about 2.0, or, for example, about 0.2 to about 1.8, or about 0.4 to about 1.5. While not wishing to be bound by theory, it is understood that when the electrolyte has a molar ratio of the ionic liquid/lithium ions (IL/Li) within this range above, a lithium ion mobility and an ion conductivity of the electrolyte may be excellent, mechanical properties of the electrolyte are excellent, and thus lithium dendrite growth on a surface of the anode may be effectively suppressed.

A weight average molecular weight of a polymer block containing an ion conductive repeating unit that constitutes the ion conductive phase may be about 1,000 Daltons or higher, or, for example, in a range of about 1,000 Daltons to about 100,000 Daltons, or, about 5,000 Daltons to about 50,000 Daltons. When a polymer block has a weight average molecular weight within this range above, as a degree of polymerization of the block copolymer is controlled to be within an appropriate range, and an ion conductivity of the electrolyte using the block copolymer may improve.

A weight average molecular weight of the polymer block that constitutes the structural phase may be about 1,000 Daltons or higher, or, for example, in a range of about 10,000 Daltons to about 500,000 Daltons, or, about 15,000 Daltons to about 400,000 Daltons. An amount of the polymer block that constitutes the structural phase may be in a range of about 20 parts to about 45 parts, by weight or, for example, about 22 parts to about 43 parts by weight, or, about 25 parts to about 40 parts by weight, based on 100 parts by weight of the total weight of the block copolymer. While not wishing to be bound by theory, it is understood that when the polymer block has a weight average molecular weight within this range above, the electrolyte may have excellent mechanical properties and ion conductivity.

The block copolymer according to an embodiment may be a linear or a branched block-copolymer. Also, a shape of the block copolymer may be a lamellar-type, a cylinder-type, or a gyroid-type. The branched block copolymer may be, for example, a graft polymer, a star-shaped polymer, a comb polymer, or a brush polymer.

According to another embodiment, an electrolyte may be a block copolymer containing a co-continuous domain including an ion conductive phase and a structural phase, wherein the structural phase includes a polymer, which is a polymerization product of:

i) a monofunctional polymerizable monomer,
ii) a multifunctional polymerizable monomer, and
iii) an elasticity-retaining polymerizable monomer having a reactive functional group.

In the block copolymer constituting the electrolyte, a size of the co-continuous domain may be about 1 µm or greater.

The electrolyte according to an embodiment has excellent elasticity so that formation of dendrite of lithium metal may be suppressed, and at the same time, nanochannels, through which lithium ions may move fast, are percolated. Also, when mechanical properties of the electrolyte improve, and thus the electrolyte is used in a lithium secondary battery, crack occurrence may be suppressed. In this regard, electrical short-circuits in the battery during charging/discharging may be effectively prevented.

Hereinafter, a method of preparing an electrolyte according to another embodiment will be described.

For example, an electrolyte may be prepared by one-pot polymerization induced microphase separation (PIMS). In this manner, a phase is fixed by crosslinking and/or grafting while phase separation of an ion conductive phase and a structural phase occurs, and thus a co-continuous phase that does not have a domain boundary is formed over the entire structure.

An electrolyte composition is obtained by mixing a polymer for forming an ion conductive phase having a chain transfer agent and a monomer for forming a structural phase polymer. Polymerization of the electrolyte composition is performed to obtain an electrolyte. Here, the polymer for forming an ion conductive phase may be an ion conductive polymer.

The electrolyte composition may further include at least one selected from an ionic liquid, an alkali metal salt, and an alkali earth metal salt. Also, the electrolyte obtained from the polymerization may be impregnated with at least one selected from an ionic liquid, an alkali metal salt, and an alkali earth metal salt.

The electrolyte composition may further include a plurality of inorganic particles. The inorganic particles may include at least one selected from a metal oxide, a metal hydroxide, a metal carbonate, a metal carboxylate, a metal silicate, a metal aluminosilicate, a metal carbide, a metal nitride, a carbon oxide, a carbonaceous material, and an organic-inorganic composite. But the inorganic particles are not limited thereto, and any inorganic particles that may improve ion conductivity and mechanical strength of the electrolyte may be used. For example, the inorganic particles may be of at least one type selected from $SiO_2$, $TiO_2$, ZnO, $Al_2O_3$, $BaTiO_3$, cage-structured silsesquioxane and a metal-organic framework (MOF). An amount of the inorganic particle may be in a range of about 1 part to about 20 parts by weight, or, for example, about 1 part to about 15 parts by weight, based on 100 parts by weight of the total weight of the electrolyte.

The electrolyte composition may further include an organic solvent. Here, examples of the organic solvent may be an ether solvent, such as diethyl ether, tetrahydrofuran, and 1,4-dioxane, a ketone solvent, such as acetone and methyl ethyl ketone, a nitrile solvent, such as acetonitrile or propionitrile, an alcohol solvent, such as methanol and ethanol, an aprotic dipolar solvent, such as dimethylsulfoxide or N,N-dimethylformamide, a halogenated alkane solvent, such as methylene chloride or 1,2-dichloromethane, or a combination thereof.

The electrolyte composition includes a polymerization initiator to initiate polymerization. A polymerization initiator may be, for example, a thermal initiator or a photoinitiator such as a free radical photoinitiator and/or an ionic photoinitiator. A thermal initiator can be an azo compound such as 4,4-azobis(4-cyanovaleric acid), 1,1'-azobis(cyclohexanecarbonitrile), or 2,2'-azobisisobutyronitrile (AIBN); an inorganic peroxide such as ammonium persulfate, hydroxymethanesulfinic acid monosodium salt dehydrate, and sodium or potassium persulfate; and an organic peroxide such as benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, lauroyl peroxide, 2,4-pentanedione peroxide, and peracetic acid, but is not limited thereto. A photoinitiator can be benzoin and its derivatives such as benzoin ethyl ether, benzoin isobutyl ether, or benzoin methyl ether; a benzyl ketal; acetophenone and its derivatives such as 2,2-diethoxyacetophenone, 2,2-dimethoxy-2-phenylacetophenone, 4'-ethoxyacetophenone, 3'-hydroxyacetophenone, 4'-hydroxyacetophenone; benzophenone and its derivatives such as 3-hydroxybenzophenone, 4-hydroxybenzophenone, 4'-phenoxyacetophenone; an acylphosphine oxide, such as diphenyl(2,4,6-trimethylbenzoyl)phosphine oxide, but are not limited thereto. An example of the polymerization initiator may be azobisisobutyronitrile (AIBN). An amount of the polymerization initiator may be the level generally used in the art. For example, the polymerization initiator may be included in an amount of about 0.01 to 5 wt % based on the total amount of the electrolyte composition. Within the above range, it may be included in an amount of about 0.1 to about 4 wt % or about 0.1 to about 2 wt %. While not wishing to be bound by a theory, it is understood that when the photoinitiator is included within the above ranges, the reaction may be effectively initiated.

The electrolyte thus obtained may be prepared in any desired shape, for example, in the form of a membrane, a film, or a sheet having a thickness in a range of about 10 μm to about 200 μm, or, for example, about 10 μm to about 100 μm, or, in particular, about 10 μm to about 60 μm. An electrolyte may be prepared in the form of a sheet, a film, or a membrane, by using a known method such as spin-coating, roll-coating, curtain-coating, pressing, casting, screen printing, or inkjet printing.

For example, an electrolyte may be obtained by coating a substrate with the electrolyte composition, evaporating a solvent from the electrolyte composition to form a film on the substrate, and detaching the film from the substrate.

For example, the electrolyte may be in a solid state.

The polymer for forming an ion conductive phase which has a chain transfer agent at the end may be an asymmetric end capped ion conductive polymer having a residue derived from the chain transfer agent at one end.

The asymmetric end capped ion conductive polymer having a residue derived from the chain transfer agent at one end is obtained by reacting an ion conductive polymer, which is a polymer for forming an ion conductive phase, with a chain transfer agent. A method of obtaining an ion conductive polymer having a chain transfer agent at the end by reacting the ion conductive polymer with the chain transfer agent may be any known method in the art.

The monomer for forming a structural phase polymer may include:

i) a monofunctional polymerizable monomer, ii) a multifunctional polymerizable monomer, and/or iii) a polymerizable monomer having a reactive functional group.

The chain transfer agent bonded to the ion conductive polymer during the polymerization process may be transferred to the structural phase polymer. The chain transfer agent (also, referred to as "a reversible addition-fragmentation chain transfer agent (RAFT)") is a material that is used in living radical polymerization capable of accurately controlling a polymer to have a desired molecular weight and a molecular weight distribution, and the chain transfer agent either transfers an active point of a chain transfer reaction or accelerates a chain transfer reaction.

While copolymerization of a monofunctional polymerizable monomer, a multifunctional polymerizable monomer, and a polymerizable monomer having a reactive functional group are proceeded through the polymerization, crosslinking of the multifunctional polymerizable monomer and crosslinking and/or grafting reaction between the reactive functional groups of the polymerizable monomers having a reactive functional group are performed to prepare a polymer for forming a structural phase. A block copolymer having a co-continuous structure formed by induction of phase separation through the copolymerization and the crosslinking or through the copolymerization and crosslinking and/or the graft reaction is obtained.

The electrolyte composition may further include at least one selected from an ionic liquid, an alkali metal salt, and an alkali earth metal salt. Also, the electrolyte may further include at least one selected from an ionic liquid, an alkali metal salt, and an alkali earth metal salt.

The chain transfer agent containing the ion conductive phase polymer is prepared by reacting at least one selected from a polyether, an acrylic resin, a methacrylic resin, and a polysiloxane with a chain transfer agent.

The polymerization, copolymerization, and crosslinking are performed by reversible addition-fragmentation charging transfer (RAFT) polymerization. The graft reaction may also be performed by the RAFT polymerization. The RAFT reaction may be proceeded using a chain transfer agent. In this regard, when the RAFT reaction is performed using a chain transfer agent, a block copolymer having a small polydispersity and an extended chain length may be obtained. Therefore, the block copolymer may have an increased size of a co-continuous domain than a conventional block copolymer, and thus a size of the co-continuous domain of the block copolymer may be about 1 μm or greater.

The chain transfer agent is a compound represented by Formula 1a.

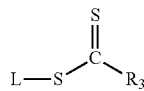

Formula 1a

In Formula 1a, L is a free radical leaving group, and $R_3$ is a group that controls C=S double bond reactivity towards addition of radicals and a fragmentation rate.

In an embodiment, the chain transfer agent is a compound represented by Formula 1 b.

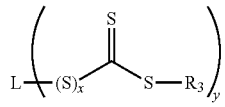

Formula 1b wherein in Formula 1b,
x is 0 or 1, and
L is a y valent $C_{1-20}$ organic group.

In an embodiment, L is substituted or unsubstituted, and may be a $C_{1-20}$ alkyl, $C_{3-20}$ cycloalkyl, $C_{2-20}$ heterocyclic, $C_{6-20}$ aryl, or $C_{7-20}$ aralkyl, and may contain a halogen, ether, sulfide, carboxylic acid, ester, amide, nitrile, or other functional group. While y may be any integer of 1 or greater depending on the valence of group L, y is preferably an integer of from 1 to 3, and more preferably 1 or 2.

Also in the formula (I), $R_3$ is a substituted or unsubstituted $C_{1-20}$ alkyl, $C_{3-20}$ cycloalkyl, $C_{6-20}$ aryl, or $C_{7-20}$ aralkyl. For example, $R_3$ may be derived from a radical initiator such as a peroxy or diazo initiator.

An example of L may be —$CH_2CN$, —$C(CH_3)_2CN$, —$C(CN)(CH_3)CH_2C(=O)OH$, —$C(CH_3)_2CN$, or —$C(CH_3)_2 C(=O)OH$. Also, an example of $R_3$ may be a phenyl group, —$SC_{12}H_{25}$, or —$N(CH_3)C_6H_5$.

An example of the chain transfer agent may be a thiocarbonylthio compound such as dithioester, dithiocarbamate, trithiocarbonate, or xanthate, and, for example, the chain transfer agent may be one selected from compounds represented by Formula 1b.

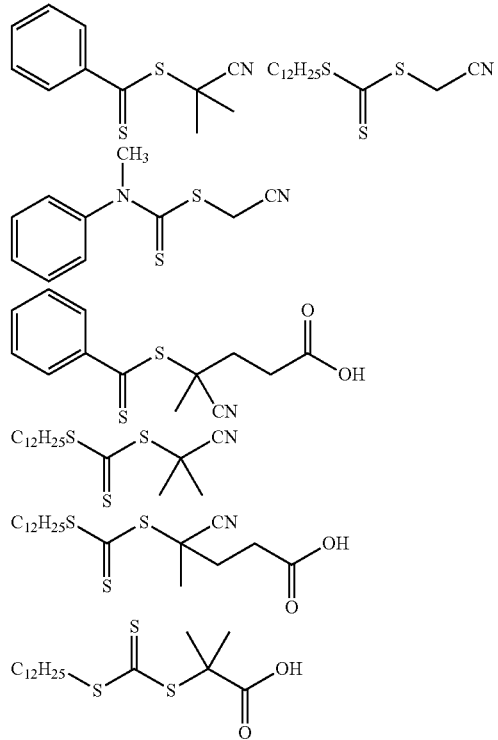

Formula 1b

The chain transfer agent containing an ion conductive phase polymer may be, for example, a compound represented by Formula 3.

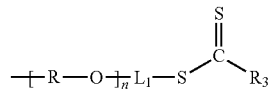

Formula 3

In Formula 3, $L_1$ is a group derived from L in Formula 1, and an example of $L_1$ may be —$C(=O)$—$C(R_1)(R_2)$— or —$C(=O)$—$(CH_2)_k$—$C(R_1)(R_2)$— (wherein, k is an integer of 1 to 5). Also, an example of $R_3$ may be a substituted or unsubstituted $C_1$-$C_{20}$ alkyl group, a substituted or unsubstituted $C_2$-$C_{20}$ alkenyl group, a substituted or unsubstituted $C_6$-$C_{50}$ aryl group, a substituted or unsubstituted $C_6$-$C_{50}$ heteroaryl group, a substituted or unsubstituted $C_5$-$C_{34}$ saturated or unsaturated carbocyclic group, a substituted or unsubstituted $C_5$-$C_{34}$ aromatic carbocyclic group, a substituted or unsubstituted $C_5$-$C_{34}$ heterocyclic group, a cyano group, a $C_1$-$C_{20}$ alkylthio group, a $C_1$-$C_{20}$ alkoxy group, or a $C_2$-$C_{20}$ dialkylamino group.

$R_3$ may be, for example, a phenyl group, —$SC_{12}H_{25}$, —$C_6H_5$, or —$N(CH_3)C_6H_5$.

$R_1$ and $R_2$ may be each independently a hydrogen, a cyano group, a substituted or unsubstituted $C_1$-$C_{20}$ alkyl group, a substituted or unsubstituted $C_2$-$C_{20}$ alkenyl group, a substituted or unsubstituted $C_6$-$C_{50}$ aryl group, a substituted or unsubstituted $C_6$-$C_{50}$ heteroaryl group, a substituted or unsubstituted $C_5$-$C_{34}$ cycloalkyl group, a substituted or unsubstituted $C_5$-$C_{34}$ saturated or unsaturated carbocyclic group, a substituted or unsubstituted $C_5$-$C_{34}$ aromatic carbocyclic group, a substituted or unsubstituted $C_5$-$C_{34}$ heterocyclic group, a $C_1$-$C_{20}$ alkylthio group, a $C_1$-$C_{20}$ alkoxy group, or a $C_2$-$C_{20}$ dialkylamino group.

In particular, $L_1$ may be —C(=O)CH$_2$C(CN)(CH$_3$)— or —C(=O)C(CH$_3$)$_2$—.

The compound represented by Formula 3 may be, for example, a compound represented by Formula 3a.

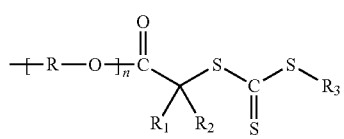

Formula 3a

In Formula 3a, $R_1$ to $R_3$ are each independently a hydrogen, a cyano group, a substituted or unsubstituted $C_1$-$C_{20}$ alkyl group, a substituted or unsubstituted $C_2$-$C_{20}$ alkenyl group, a substituted or unsubstituted $C_6$-$C_{50}$ aryl group, a substituted or unsubstituted $C_6$-$C_{50}$ heteroaryl group, a substituted or unsubstituted $C_5$-$C_{34}$ saturated or unsaturated carbocyclic group, a substituted or unsubstituted $C_5$-$C_{34}$ aromatic carbocyclic group, a substituted or unsubstituted $C_5$-$C_{34}$ heterocyclic group, a $C_1$-$C_{20}$ alkylthio group, a $C_1$-$C_{20}$ alkoxy group, or a $C_2$-$C_{20}$ dialkylamino group.

R is substituted or unsubstituted C2-C10 alkylene, and n is a degree of polymerization which is a number selected from 3 to 5,000.

The chain transfer agent including an ion conductive phase is a compound represented by Formula 4.

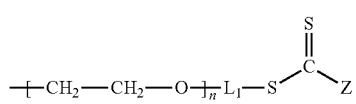

Formula 4

In Formula 4, n, $L_1$, and Z are the same as defined in connection with Formula 3.

An example of the compound represented by Formula 4 may be a polymer represented by Formula 4a.

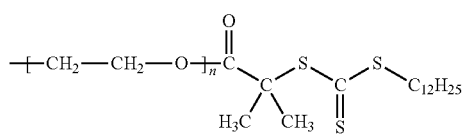

Formula 4a

In Formula 4a, n is a degree of polymerization which is a number selected from 2 to 5,000.

A weight average molecular weight of the chain transfer agent containing the polymer for forming an ion conductive phase may be in a range of about 300 Daltons to about 28,000 Daltons.

A temperature for performing the polymerization varies depending on types of the starting materials. For example, the polymerization is performed at a reaction temperature in a range of about 20° C. to about 150° C., for example, about 100° C. to about 120° C.

When an electrolyte includes the block copolymer prepared by using the method, the electrolyte may have excellent ion conductivity and mechanical properties in addition to excellent elasticity.

An electrolyte according to an embodiment includes a block copolymer of:

i) a polymer that is a polymerization product of styrene, 1,4-divinylbenzene, and 1,6-hexadiene and ii) a polyethylene oxide.

An electrolyte according to another embodiment includes a block copolymer of:

i) a polymer that is a polymerization product of styrene, 1,4-divinylbenzene, and butyl acrylate and ii) a polyethylene oxide.

The residue derived from a chain transfer agent is bonded to an end of the polymer included in a structural phase, and a linker (also, referred to as "a junk block") derived from a chain transfer agent may be present between the polymer for forming an ion conductive phase and the polymer for forming a structural phase.

The residue may be —S—C(=S)—$R_3$, the linker is —C(=O)—C($R_1$)($R_2$)— or —C(=O)—(CH$_2$)$_k$—C($R_1$)($R_2$)— (wherein, k is an integer of 1 to 5), and $R_1$ to $R_3$ are each independently a hydrogen, a cyano group, a substituted or unsubstituted $C_1$-$C_{20}$ alkyl group, a substituted or unsubstituted $C_2$-$C_{20}$ alkenyl group, a substituted or unsubstituted $C_6$-$C_{50}$ aryl group, a substituted or unsubstituted $C_6$-$C_{50}$ heteroaryl group, a substituted or unsubstituted $C_5$-$C_{34}$ saturated or unsaturated carbocyclic group, a substituted or unsubstituted $C_5$-$C_{34}$ aromatic carbocyclic group, a substituted or unsubstituted $C_5$-$C_{34}$ heterocyclic group, a $C_1$-$C_{20}$ alkylthio group, a $C_1$-$C_{20}$ alkoxy group, or a $C_2$-$C_{20}$ dialkylamino group.

An example of the residue may be —S—C(=S)—$C_{12}H_{25}$, —S—C(=S)—$C_6H_5$, or —S—C(=S)—N(CH$_3$)$C_6H_5$, and an example of the linker may be —C(=O)—CH$_2$—, —C(=O)—C(CH$_3$)$_2$—, —C(=O)—CH$_2$—C(CH$_3$)$_2$—, —C(=O)—CH$_2$CH$_2$—C(CH$_3$)$_2$—, or —C(=O)—CH$_2$CH$_2$—C(CH$_3$)(CN)—.

The electrolyte may include a block copolymer represented by Formula 1 or a block copolymer represented by Formula 2.

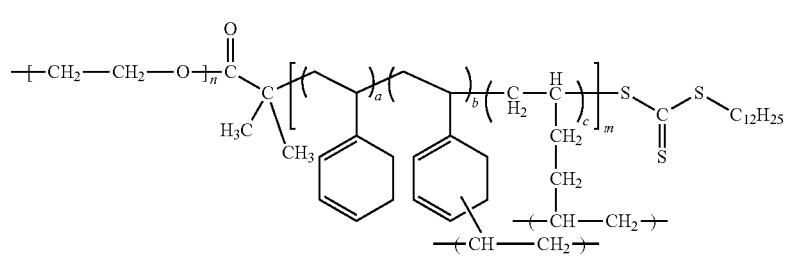

Formula 1

In Formula 1, m and n each independently denotes a degree of polymerization, m is a number selected from 2 to 5,000, and n is a number selected from about 2 to about 5,000, or, for example, about 5 to about 1,000, and a, b, and c are each independently a mole fraction which is selected from 0 to 1, and the sum of a, b, and c is 1.

for example, about 0.05 to about 0.3, or, for example, about 0.1111 to about 0.2, and c is in a range of, for example, about 0.2 to about 0.7, or about 0.4 to about 0.6667.

A molar ratio of the monofunctional polymerizable monomer, the multifunctional polymerizable monomer, and the polymerizable monomer having a reactive functional group Formula 2

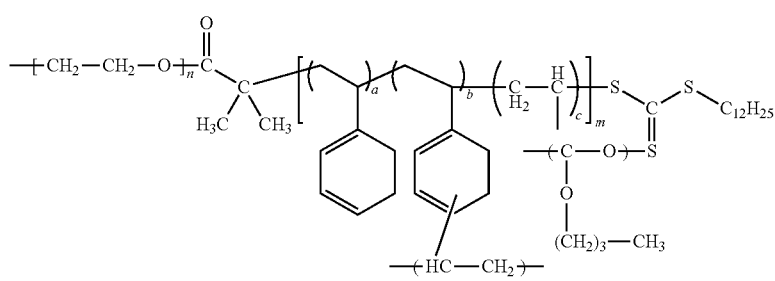

In Formula 2, each independently denotes a degree of polymerization, m is a number selected from 2 to 5,000, and n is a number selected from about 2 to about 5,000, or, for example, about 5 to about 1,000, and a, b, and c are each independently a mole fraction which is selected from 0 to 1, and the sum of a, b, and c is 1.

An example of the block copolymer represented by Formula 1 may be a block copolymer represented by Formula 1c.

in the mixture is 4:1:4 (44.445:11.11:44.445), 1:1:4 (16.665:16.665:66.67), 2:1:2 (40:20:40), or 2:1:4 (28.57:14.29:57.14).

In some embodiments, a modulus of elasticity of the electrolyte at room temperature (about 25° C.) may be excellent, and may be about 4.0 mega Pascals (MPa) or higher, for example, in a range of about 4.0 MPa to about 1,200 MPa. Tensile strength of the electrolyte may be 0.01 MPa or higher, for example, in a range of about 0.1 to about Formula 1c

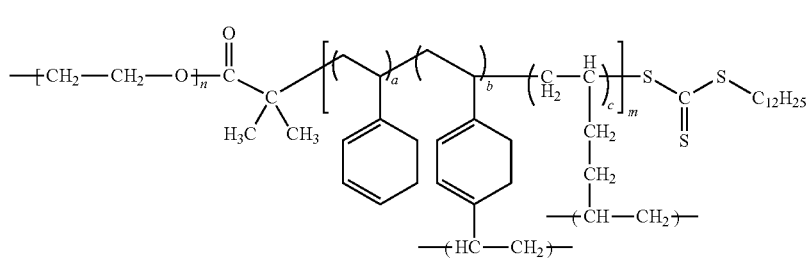

In Formula 1c, m, n, a, b, and c are the same as defined in connection with Formula 1.

An example of the block copolymer represented by Formula 2 may be a block copolymer represented by Formula 2a.

20 MPa. In this regard, the electrolyte may simultaneously secure mechanical properties required for a battery performance even at room temperature.

The electrolyte may further include a plurality of inorganic particles. The inorganic particles may include at least Formula 2a

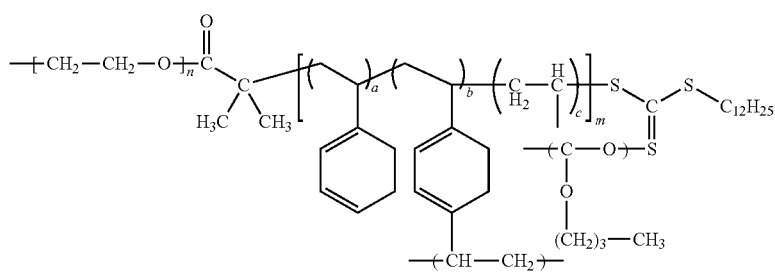

In Formula 2a, m, n, a, b, and c are the same as defined in connection with Formula 2.

In Formula 1, Formula 1c, Formula 2, and Formula 2a, a is in a range of, for example, about 0.15 to about 0.5, or, for example, about 0.16665 to about 0.44445, b is in a range of, one selected from a metal oxide, a metal hydroxide, a metal carbonate, a metal carboxylate, a metal silicate, a metal aluminosilicate, a metal carbide, a metal nitride, a carbon oxide, a carbonaceous material, and an organic-inorganic composite. But the inorganic particles are not limited thereto, and any inorganic particles that may improve ion conductivity and mechanical strength of the electrolyte may be used. For example, the inorganic particles may be at least one type of an inorganic particle selected from $SiO_2$, $TiO_2$, ZnO, $Al_2O_3$, $BaTiO_3$, cage-structured silsesquioxane, and a metal-organic framework (MOF).

An average particle diameter of the inorganic particle may be less than 100 nm. For example, an average particle diameter of the inorganic particle may be in a range of about 1 nm to about 100 nm. For example, an average particle diameter of the inorganic particle may be in a range of about 5 nm to about 100 nm. For example, an average particle diameter of the inorganic particle may be in a range of about 10 nm to about 100 nm. For example, an average particle diameter of the inorganic particle may be in a range of about 10 nm to about 70 nm. For example, an average particle diameter of the inorganic particle may be in a range of about 30 nm to about 70 nm. While not wishing to be bound by a theory, it is understood that when an average particle diameter of the inorganic particle is within these ranges, an electrolyte including the inorganic particle may have excellent layer-forming property and excellent mechanical properties without deterioration of ion conductivity.

The metal-organic framework is a porous crystalline compound formed of a Group 2 to 15 metal ion or a Group 2 to 15 metal ion cluster with an organic ligand through a chemical bond.

The organic ligand denotes an organic group capable of participating in a chemical bond such as a coordinate covalent bond, an ion bond, or a covalent bond, and, for example, an organic group having at least two sites capable of binding with the metal ion may bond with the metal ion and form a stable structure.

The Group 2 to 15 metal ion is at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chrome (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi), and the organic ligand is a group derived from at least one of compounds, each containing at least one functional group selected from aromatic dicarboxylic acid, aromatic tricarboxylic acid, imidazole compound, a tetrazole, 1,2,3-triazole, 1,2,4-triazole, pyrazole, aromatic sulfonic acid, aromatic phosphoric acid, aromatic sulfinic acid, aromatic phosphinic acid, bipyridine, amino group, imino group, amide group, methanedithioic acid group (—C(=S)SH), anion group of methanedithionic acid (—C(=S)S−), pyridine group, and pyrazine group.

Examples of the aromatic dicarboxylic acid and the aromatic tricarboxylic acid may include benzenedicarboxylic acid, benzenetricarboxylic acid, biphenyldicarboxylic acid, and triphenyldicarboxylic acid.

For example, the organic ligand may be a group that is derived from a compound represented by Formula 4b.

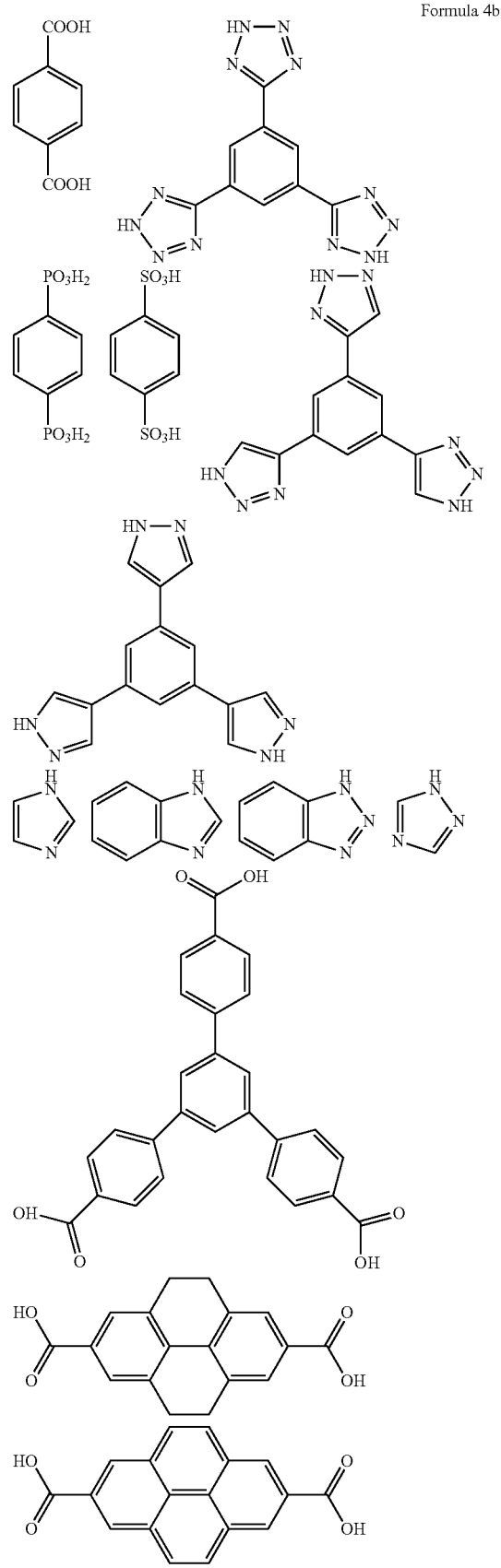

Formula 4b

The metal-organic framework may be, for example, $Ti_8O_8(OH)_4[O_2C-C_6H_4CO_2]_6$, $Cu(bpy)(H_2O)_2$ ($BF_4$), (bpy) (wherein, bpy=4,4'-bipyridine), or $Zn_4O(O_2C-C_6H_4-CO_2)_3$ (Zn-terephthalic acid-MOF, Zn-MOF).

The electrolyte according to an embodiment may be used as a protective layer that protects an anode. In this regard, when the electrolyte is used as a protective layer, an electrolyte may be further included in a battery. Here, the electrolyte may be disposed between a cathode and the electrolyte according to an embodiment used as a protective layer. The electrolyte is at least one selected from a liquid electrolyte, a solid electrolyte, a gel electrolyte, a polymer ionic liquid, and a separator.

According to another embodiment, a secondary battery includes an electrolyte according to an embodiment. The secondary battery has a stacked structure of a cathode, the electrolyte, and an anode.

The electrolyte may be used in a charge transfer layer of a light emitting diode or an energy storage device such as a supercapacitor.

The secondary battery may further include at least one selected from a liquid electrolyte, a polymer ionic liquid, a solid electrolyte, and a gel electrolyte. The at least one selected from a liquid electrolyte, a polymer ionic liquid, a solid electrolyte, and a gel electrolyte may be disposed between a cathode and the electrolyte according to an embodiment.

As described above, when a battery further includes at least one selected form a liquid electrolyte, a polymer ionic liquid, a solid electrolyte, and a gel electrolyte, an ion conductivity and mechanical properties of the battery may further improve.

The liquid electrolyte may further include at least one selected from an organic solvent, an ionic liquid, an alkali metal salt, and an alkali earth metal salt.

Non-limiting examples of the organic solvent are a carbonate compound, a glyme compound, and a dioxolane compound. The carbonate compound may be ethylene carbonate, propylene carbonate, dimethyl carbonate, fluoroethylene carbonate, diethyl carbonate, or ethylmethyl carbonate. The glyme compound may be, for example, at least one selected from poly(ethylene glycol)dimethyl (PEGDME, polyglyme), tetra(ethylene glycol)dimethyl ether (TEGDME, tetraglyme), tri(ethylene glycol)dimethyl ether (triglyme), poly(ethylene glycol)dilaurate (PEGDL), poly(ethylene glycol)monoacrylate (PEGMA), and poly(ethylene glycol)diacrylate (PEGDA).

The dioxolane compound may be, for example, at least one selected from 3-dioxolane, 4,5-diethyl-dioxolane, 4,5-dimethyl-dioxolane, 4-methyl-1,3-dioxolane, and 4-ethyl-1,3-dioxolane.

The organic solvent may be 2,2-dimethoxy-2-phenylacetophenone, dimethoxyethane, diethoxyethane, tetrahydrofuran, gamma-butyrolactone, or trimethyl phosphate.

The polymer ionic liquid may be, for example, a polymerization product of ionic liquid monomers, or a polymeric compound. The polymer ionic liquid is highly soluble in an organic solvent, and thus, when the polymer ionic liquid is further added to the electrolyte, the ionic conductivity of the electrolyte may further improve.

In preparing a polymer ionic liquid by polymerization of ionic liquid monomers as described above, the resulting product from polymerization reaction may be washed and dried, followed by anionic substitution reaction to obtain appropriate anions that may improve solubility of the polymerization product in an organic solvent. In some embodiments, the polymer ionic liquid may include a repeating unit that includes:

i) a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and combinations thereof, and ii) at least one anion selected from $BF_4^-$, $PF_6^-$, $AsF_6^-$, $SbF_6^-$, $AlCl_4^-$, $HSO_4^-$, $cH_3SO_3^-$, $(CF_3SO_2)_2N^-$, $Cl^-$, $Br^-$, $I^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $(CF_3SO_2)_2N^-$, $NO_3^-$, $Al_2Cl_7^-$, $CH_3COO^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In some embodiments, the polymer ionic liquid may be prepared by polymerization of ionic liquid monomers. These ionic liquid monomers may have a functional group polymerizable with a vinyl group, an aryl group, an acrylate group, and a methacrylate group, and may include a cation of at least one selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, and combinations thereof, and at least one of the above-listed anions.

Non-limiting examples of the ionic liquid monomers are 1-vinyl-3-ethylimidazolium bromide, a compound represented by Formula 5, or a compound represented by Formula 6.

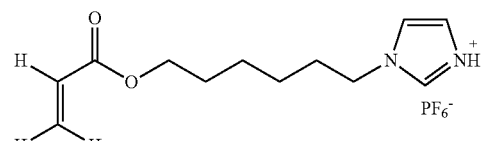

Formula 5

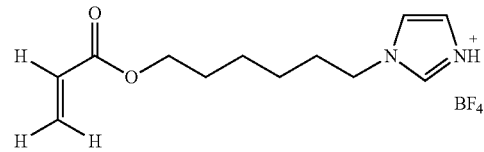

Formula 6

For example, the polymer ionic liquid may be a compound represented by Formula 7 or a compound represented by Formula 8.

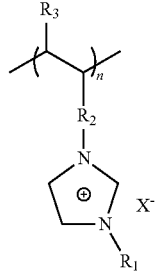

Formula 7

In Formula 7, $R_1$ and $R_3$ may be identical to or different from each other, and may be each independently a hydrogen or a C1-C12 hydrocarbon group, and may optionally include at least one heteroatom. In Formula 7, $R_2$ is a chemical bond or a hydrocarbon group having 1 to 16 carbons which may optionally include one or more heteroatoms. Also, X⁻ may indicate an anion of the ionic liquid.

The polymer ionic liquid represented by Formula 7 may include a cation selected from poly(l-vinyl-3-alkylimidazolium) cation, poly(l-allyl-3-alkylimidazolium) cation represented by Formula 8, and poly(1-(methacryloyloxy-3-alkylimidazolium) cation; and an anion selected from $CH_3COO^-$, $CF_3COO^-$, $CH_3SO_3^-$, $CF_3SO_3^-$, $(CF_3SO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

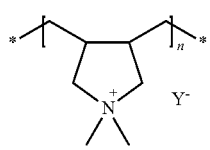

Formula 8

In Formula 8, Y⁻ is the same as defined in connection with X⁻ in Formula 7, and, for example, Y⁻ may be bis(trifluoromethanesulfonyl)imide (TFSI), $BF_4$, or $CF_3SO_3$, and n is a number selected from 500 to 2,800.

The compound represented by Formula 8 may be polydiallyldimethylammonium bis(trifluoromethanesulfonyl) imide.

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme).

The low-molecular weight polymer may have a weight average molecular weight of about 75 to about 2,000, for example, a weight average molecular weight of about 250 to about 500. Also, the thermally stable ionic liquid may be the same as those listed above in conjunction with the above-described ionic liquid. The lithium salt may be any of the compounds described above as alkali metal salts as long as it includes lithium as an alkali metal.

When the electrolyte further includes a gel electrolyte, the electrolyte may have further improved conductivity.

The gel electrolyte may be any electrolyte in gel form known in the art.

For example, the gel electrolyte may include a polymer and a polymer ionic liquid.

For example, the polymer may be a solid graft (block) copolymer electrolyte.

In some embodiments, the electrolyte may further include a solid electrolyte. For example, the solid electrolyte may be an organic solid electrolyte or an inorganic solid electrolyte.

Non-limiting examples of the organic solid electrolyte are polyethylene derivatives, polyethylene oxide derivatives, polypropylene oxide derivatives, a phosphoric acid ester polymer, a polyester sulfide, a polyvinyl alcohol, a polyfluoride vinylidene, and polymers including ionic dissociative groups.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (wherein 0.1≤x≤0.9), $Li_{1+x}Hf_{2-x}Al_x(PO_4)_3$ (wherein 0.1≤x≤0.9), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-silicate, $Li_{0.3}La_{0.5}TiO_3$, $Na_5MSi_4O_{12}$ (wherein M is a rare earth element, such as Nd, Gd, Dy, or the like), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein 0≤x≤0.8, 0≤y≤1.0, and M is Nd, Sm, Eu, Gd, Tb, Dy, Ho, Er, Tm, or Yb), $Li_{1+x+y}Q_xTi_{2-x}Si_yP_{3-y}O_{12}$ (wherein 0<x≤0.4, 0<y≤0.6, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), and $Li_{7+x}A_xLa_{3-x}Zr_2O_{12}$ (wherein 0<x<3, and A is Zn).

The separator for the electrolyte may be a monolayer or a multilayer including at least two layers of polyethylene, polypropylene, polyvinylidene fluoride, or a combination thereof. The multilayer may be a mixed multilayer. For example, the separator may be a two-layered separator of polyethylene/polypropylene, a three-layered separator of polyethylene/polypropylene/polyethylene, a three-layered separator of polypropylene/polyethylene/polypropylene, or the like.

In some embodiments, the electrolyte may be in solid or gel form. The electrolyte may be formed as a membrane, film, or sheet having a thickness of about 200 µm or less, and in some embodiments, about 10 µm to about 200 µm, and in some embodiments, about 10 µm to about 100 µm, and in some other embodiments, about 10 µm to about 60 µm. An electrolyte in the form of sheet, film, or membrane may be formed using a known technology, such as spin coating, roll coating, curtain coating, extruding, casting, screen printing, or inkjet printing.

In some embodiments, the electrolyte may have a solid phase. Also, a thickness of the electrolyte may be about 100 µm or less, or, for example, about 30 µm to about 60 µm.

In some embodiments, the electrolyte may have an ionic conductivity (at 25° C.) of about 1×10⁻⁴ Siemens per centimeter (S/cm) or greater, for example, about 1×10⁻⁴ to about 1×10⁻³ S/cm at 25° C. The electrolyte may have a Young's modulus (at 25° C.) of about 4.0 MPa or greater, for example, about 10 MPa to about 2,000 MPa. Accordingly, an electrolyte according to any of the above-described embodiments may have good ionic conductivity and good mechanical properties at room temperature that are requirements for the performance of a battery.

The electrolyte may further include at least one selected from a liquid electrolyte, a solid electrolyte, a gel electrolyte, a polymer ionic liquid, and a separator. In this regard, the electrolyte may be a mixed electrolyte type.

According to another embodiment, a secondary battery may be, for example, a lithium battery, a lithium air battery, a lithium sulfur battery, a lithium sodium battery, or a lithium magnesium battery.

A lithium magnesium battery is a battery using relatively cheap and available magnesium metal, instead of rare lithium, as an anode. The lithium/magnesium battery is charged or discharged with intercalation and deintercalation of magnesium ions into/from a cathode active material, and has about 2 times higher theoretical energy density than lithium batteries, and is cheap and stable in the air. In addition, due to environmental friendliness, strong price competitiveness, and high energy storage characteristics, the lithium/magnesium battery may be applicable as a medium and large size battery for power storage and electric vehicles, thus drawing attention as a next-generation secondary battery. A lithium sodium battery includes a cathode that allows doping and undoping of sodium ions, and an anode that allows doping and undoping of sodium ions.

A lithium battery has high operation voltage, high capacity, and high energy density, and thus is currently in wide use in mobile phones, laptop computers, storage batteries for power generating units using wind power or sunlight, electric vehicles, uninterruptable power supplies (UPS), household storage batteries, and the like.

In some embodiments, the secondary battery may further include at least one selected from a liquid electrolyte, a polymer ionic liquid, a solid electrolyte, and a gel electrolyte. At least one of a liquid electrolyte, a polymer ionic liquid, a gel electrolyte, and a solid electrolyte may be disposed between the cathode and the electrolyte.

FIGS. 1A to 1E are schematic views illustrating structures of lithium secondary batteries each including an electrolyte according to an embodiment.

Figure 1A:
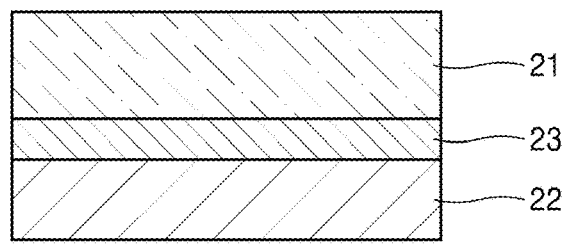
FIGS. 1A to 1E are schematic views illustrating structures of lithium batteries, each including an electrolyte according to an embodiment.

Referring to FIG. 1A, a lithium battery according to an embodiment may have a structure including an electrolyte 23 between a cathode 21 and an anode 22.

Figure 1B:
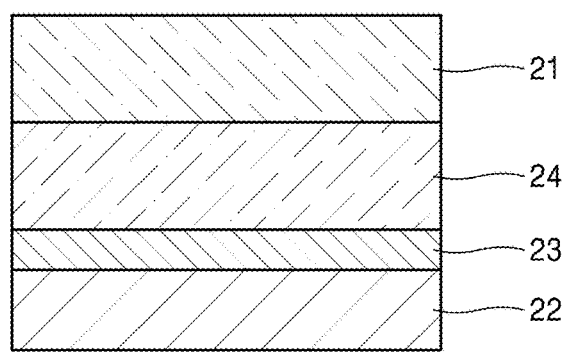
Figure 1C:
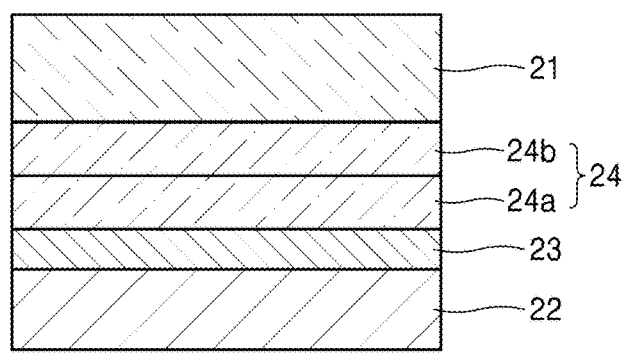

Referring to FIG. 1B, the lithium battery may further includes an intermediate layer 24 between the electrolyte 23 and the cathode 21. The intermediate layer 24 may further include at least one selected from a liquid electrolyte, a polymer ionic liquid, a solid electrolyte, and a gel electrolyte, each having a different composite from the electrolyte 23.

Since the electrolyte 23 is disposed on at least part of a surface of the anode 22, the surface of the anode 22 may become mechanically and electrochemically stable. Accordingly, dendritic growth on the surface of the anode due to non-uniform ion distribution during charging and discharging of the lithium second battery may be suppressed, and interfacial stability between the anode 22 and the electrolyte 23 may be improved, thus improving cycle characteristics of the lithium second battery.

The electrolyte 23 may serve as a protective layer for the surface of the anode 22 when it coats the surface of the anode 22. For example, the intermediate layer 24 may prevent the electrolyte 23 from directly contacting to the surface of the anode 22 that is highly reactive to the electrolyte 23. Accordingly, the intermediate layer 24 may protect the anode 22 to improve stability of the anode 22.

The intermediate layer 24 may have a bi-layer structure including a liquid electrolyte 24a and a solid electrolyte 24b that are sequentially disposed upon one another, as illustrated in FIG. 1G. The liquid electrolyte 24a may be disposed adjacent to the electrolyte 23. A lithium battery may have a stack structure of anode/electrolyte/intermediate layer (liquid electrolyte/solid electrolyte)/cathode as in FIG. 1C.

Figure 1D:
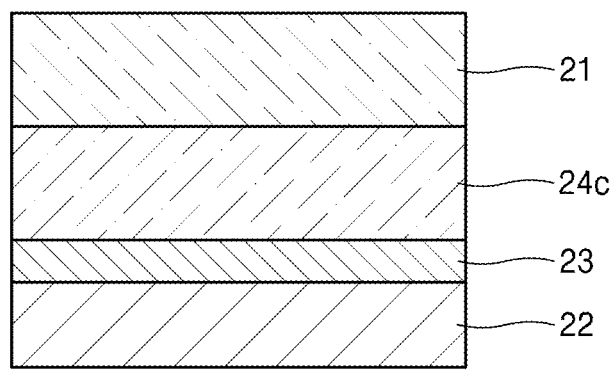
Figure 1E:
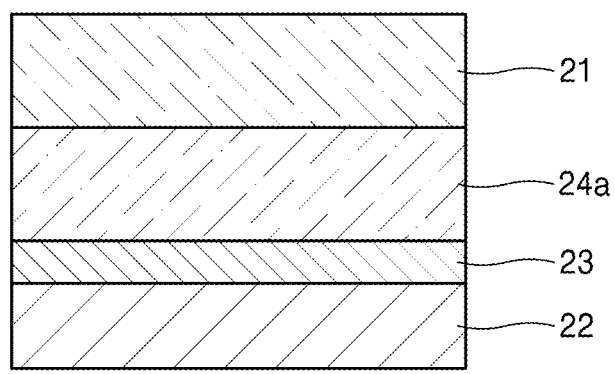

Referring to FIG. 1D, a lithium battery according to another embodiment may include a separator 24c as an intermediate layer. The separator 24c may be a monolayer or a multilayer including at least two layers of polyethylene, polypropylene, polyvinylidene fluoride, or a combination thereof. For example, the separator 24c may be a mixed multilayer, such as a 2-layer separator of polyethylene/polypropylene, a 3-layer separator of polyethylene/polypropylene/polyethylene, or a 3-layer separator of polypropylene/polyethylene/polypropylene.

A lithium battery according to an embodiment may include a liquid electrolyte 24a as an intermediate layer, as illustrated in FIG. 1B. The liquid electrolyte 24a may have the same or different composite from a liquid electrolyte that the electrolyte 23 may include.

In FIGS. 1A to 1E, the cathode 21 may be a porous cathode. The porous cathode may be a cathode including pores, or any cathode that allows permeation of liquid electrolyte thereinto by capillary action.

For example, the porous cathode may be a cathode obtained by coating a cathode active material composition including a cathode active material, a conducting agent, a binder, and a solvent, followed by drying. The resulting cathode may include pores among particles of the cathode active material. The porous cathode may be impregnated with liquid electrolyte.

In some embodiments, the cathode 21 may include a liquid electrolyte, a gel electrolyte, a solid electrolyte, or the like. The liquid electrolyte, the gel electrolyte, and the solid electrolyte may be any electrolyte available for liquid batteries in the art that does not react with the cathode active material to deteriorate the same during charging and discharging.

In FIGS. 1A to 1E, the anode 22 may be a lithium metal thin film. The lithium metal thin film may have a thickness of less than about 100 μm. When the thickness of the lithium metal thin film is less than about 100 μm, the lithium battery may have stable cycle characteristics. For example, the lithium metal thin film of the lithium battery may have a thickness of about 80 μm or less, and in some embodiments, about 60 μm or less, and in some other embodiments, about 0.1 μm to about 60 μm. According to the prior art, when such a lithium metal thin film has a thickness of less than 100 μm, it is difficult to implement a lithium battery with stable cycle characteristics since the thickness of the lithium metal thin film may be seriously reduced due to a side reaction, dendrite formation, or the like. However, a lithium battery with stable cycle characteristics may be manufactured using any of the electrolytes according to the above-described embodiments.

Figure 1F:
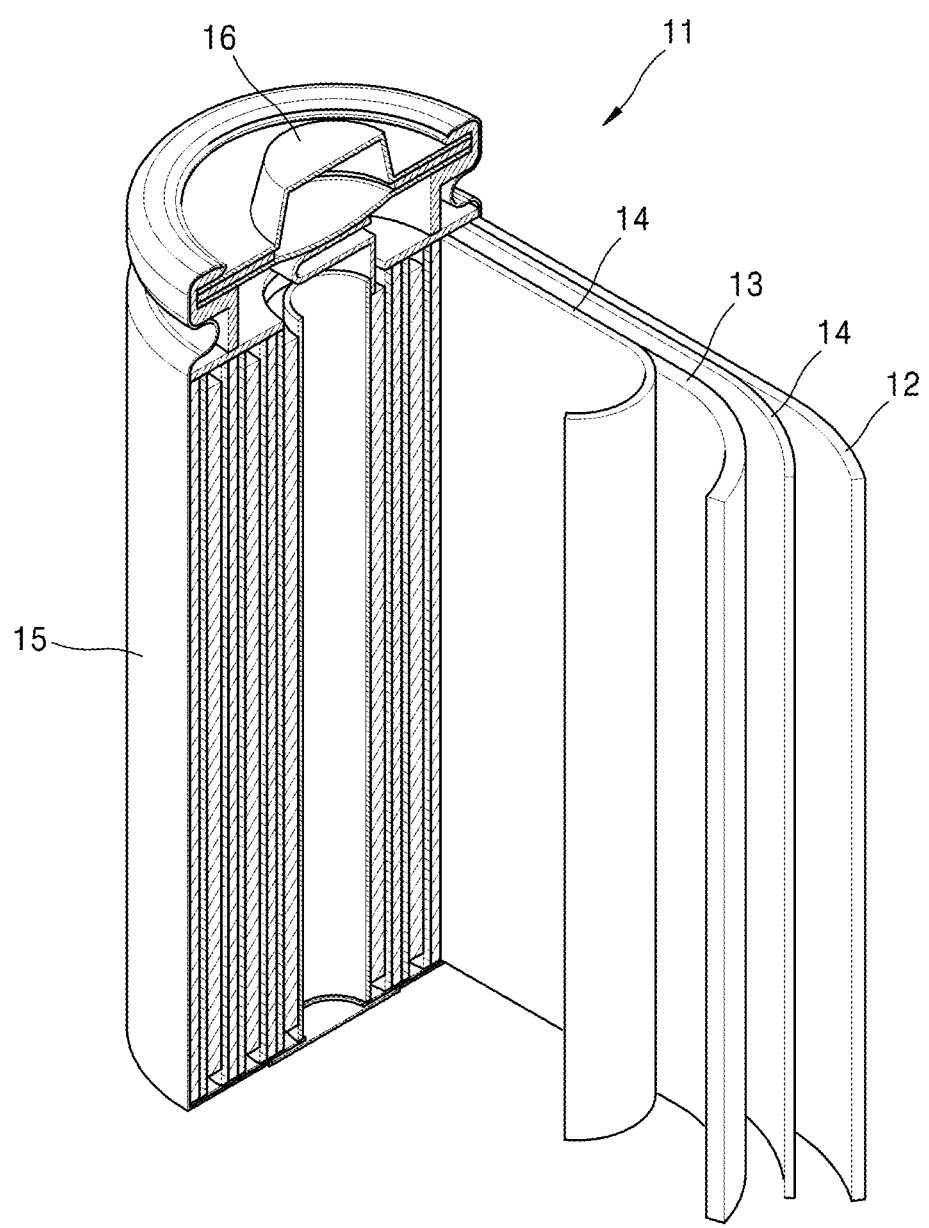
FIG. 1F is an exploded perspective view of a structure of a lithium battery including an electrolyte according to another embodiment.

FIG. 1F is an exploded perspective view of a structure of a lithium battery 11 according to an embodiment.

Referring to FIG. 1F, the lithium battery 11 may include a cathode 13, an anode 12, and an electrolyte 14 according to an embodiment. The cathode 13, the anode 12, and the electrolyte 14 may be rolled or folded and then be accommodated in an electrode case 15, followed by injecting a liquid electrolyte into the battery case 15 and sealing with a cap assembly 16, thereby completing manufacture of the lithium ion secondary battery 11. The battery case 15 may be a cylindrical, rectangular, or thin-film type. For example, the lithium battery 11 may be a large thin-film battery. The lithium battery 11 may be, for example, a lithium ion secondary battery.

A separator (not shown) may be further disposed between the cathode 13 and anode 12 to form an battery assembly. The battery assembly may be staked on another electrode.

The battery assembly to form a bi-cell structure, which may then be impregnated with an electrolyte solution. The resultant may be accommodated in a pouch and then sealed to complete manufacture of a lithium polymer secondary battery.

In some embodiments, a plurality of such battery assemblies may be stacked upon one another to form a battery pack. The battery pack may be applicable in any device that needs to have high capacity, for example, a laptop computer, a smart phone, an electrical vehicle, or the like.

According to another aspect of the present disclosure, a lithium secondary battery may include a cathode, a lithium metal or lithium metal alloy as an anode, and any of the electrolytes according to the above-described embodiments. For example, the lithium battery may be a lithium metal battery. In this regard, the anode may be a lithium metal or a lithium alloy electrode, and an additional layer of at least one selected from a liquid electrolyte, a gel electrolyte, a solid electrolyte, a separator, and a polymer ionic liquid may be further included between the electrolyte and the cathode.

The cathode or the anode may include a sheet or a film that is at least partially formed on one surface of the cathode or the anode.

The electrolyte may serve as a protective layer for the lithium metal or lithium metal alloy electrode. When the electrolyte is disposed on a surface of the anode, dendritic growth on the surface of the anode after charging and discharging, and a short circuit that may occur due to cracking of the electrolyte may both be effectively suppressed.

In some embodiments, the lithium battery may have an operation voltage of about 4.0 Volts (V) to about 5.0 V, for example, about 4.5 V to about 5.0 V.

Each of the components of the lithium battery including any of the electrolytes according to the above-described embodiments, and a method of manufacturing a lithium battery including such components as described above will be described in detail.

A cathode active material for the cathode may include at least one selected from lithium cobalt oxide, lithium nickel cobalt manganese oxide, lithium nickel cobalt aluminum oxide, lithium iron phosphate, and lithium manganese oxide, but is not limited thereto. Any cathode active material available in the art may be used.

For example, the cathode active material may be a compound represented by one of the following formulae: $Li_aA_{1-b}B'_bD'_2$ (wherein $0.90 \leq a \leq 1.8$, and $0 \leq b \leq 0.5$); $Li_aE_{1-b}B'_bO_{2-c}D'_c$ (wherein $0.90 \leq a \leq 1.8$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_\alpha$ (wherein $0.90 \leq a \leq 1.8$, $0 \leq b \leq 0.05$, $0 \leq c \leq 0.05$, and $0 < \alpha < 2$); $Li_aNi_{1-b-c}Mn_bB'_cD'_\alpha$ (wherein $0.90 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$, and $0.001 \leq b \leq 0.1$); $Li_aCoG_bO_2$ (wherein $0.90 \leq a \leq 1.8$, and $0.001 \leq b \leq 0.1$); $Li_aMnG_bO_2$ (wherein $0.90 \leq a \leq 1.8$, and $0.001 \leq b \leq 0.1$); $Li_aMn_2G_bO_4$ (wherein $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the formulae above, A is selected from nickel (Ni), cobalt (Co), manganese (Mn), and combinations thereof; B' is selected from aluminum (Al), nickel (Ni), cobalt (Co), manganese (Mn), chromium (Cr), iron (Fe), magnesium (Mg), strontium (Sr), vanadium (V), a rare earth element, and combinations thereof; D' is selected from oxygen (O), fluorine (F), sulfur (S), phosphorus (P), and combinations thereof; E is selected from cobalt (Co), manganese (Mn), and combinations thereof; F is selected from fluorine (F), sulfur (S), phosphorus (P), and combinations thereof; G is selected from aluminum (Al), chromium (Cr), manganese (Mn), iron (Fe), magnesium (Mg), lanthanum (La), cerium (Ce), strontium (Sr), vanadium (V), and combinations thereof; Q is selected from titanium (Ti), molybdenum (Mo), manganese (Mn), and combinations thereof; I' is selected from chromium (Cr), vanadium (V), iron (Fe), scandium (Sc), yttrium (Y), and combinations thereof; and J is selected from vanadium (V), chromium (Cr), manganese (Mn), cobalt (Co), nickel (Ni), copper (Cu), and combinations thereof.

For example, the cathode active material may be a compound represented by Formula 9, a compound represented by Formula 10, or a compound represented by Formula 11.

$$Li_aNi_bCo_cMn_dO_2 \qquad \text{Formula 9}$$

In Formula 9, $0.90 \leq a \leq 1.8$, $0 \leq b \leq 0.9$, $0 \leq c \leq 0.5$, and $0 \leq d \leq 0.5$.

$$Li_2MnO_3 \qquad \text{Formula 10}$$

$$LiMO_2 \qquad \text{Formula 11}$$

In Formula 11, M may be Mn, Fe, Co, or Ni.

A cathode may be manufactured as follows.

A cathode active material, a binder, and a solvent are mixed to prepare a cathode active material composition.

A conducting agent may be further added into the cathode active material composition. The cathode active material composition is directly coated on a metallic current collector and dried to prepare a cathode plate. Alternatively, the cathode active material composition may be cast on a separate support to form a cathode active material film, which may then be separated from the support and then laminated on a metallic current collector to prepare a cathode plate.

The conducting agent, binder, and solvent used in the cathode active material composition may be the same as those used in the anode active material composition described above. If desired, a plasticizer may be further added into the cathode active material composition and/or the anode active material composition to form electrode plates including pores. The amounts of the cathode active material, the conducting agent, the binder, and the solvent may be those levels that are generally used in lithium secondary batteries in the art. At least one of the conducting agent and the solvent may not be used depending on the use and the structure of the lithium secondary battery.

An anode may be manufactured in a substantially same manner as in the manufacture of the cathode, except for using an anode active material instead of the cathode active material.

The anode active material may be a carbonaceous material, silicon, a silicon oxide, a silicon alloy, a silicon-carbonaceous material composite, tin, a tin alloy, a tin-carbon composite, a metal oxide, or a combination thereof. The carbonaceous material may be crystalline carbon, amorphous carbon, or a combination thereof. The crystalline carbon may be graphite, such as natural graphite or artificial graphite that are in amorphous, plate, flake, spherical or fibrous form. The amorphous carbon may be soft carbon (carbon sintered at low temperatures), hard carbon, mesophase pitch carbides, sintered corks, graphene, carbon black, fullerene soot, carbon nanotubes, and carbon fibers. Any appropriate material available in the art may be used.

The anode active material may be selected from Si, $SiO_x$ (wherein $0 < x < 2$, for example, $0.5 < x < 1.5$), Sn, $SnO_2$, a silicon-containing metal alloy, and a combination thereof. A metal that is alloyable with silicon may be at least one selected from Al, Sn, Ag, Fe, Bi, Mg, Zn, In, Ge, Pb, and Ti.

The anode active material may include a metal/metalloid alloyable with lithium, an alloy thereof, or an oxide thereof. Examples of the metal/metalloid alloyable with lithium are Si, Sn, Al, Ge, Pb, Bi, SbSi—Y alloy (wherein Y is an alkali metal, an alkali earth metal, a Group XIII element, a Group XIV element, a transition metal, a rare earth element, or a combination thereof except for Si), a Sn—Y alloy (wherein Y is an alkali metal, an alkali earth metal, a Group XIII element, a Group XIV element, a transition metal, a rare earth element, or a combination thereof except for Sn), and $MnO_x$ (wherein $0 < x \leq 2$). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or combinations thereof. Non-limiting examples of the oxide of the metal/metalloid alloyable with lithium are a lithium titanium oxide, a vanadium oxide, and a lithium vanadium oxide, $SnO_2$, and $SiO_x$ (wherein 0<x<2).

For example, the anode may be a lithium anode thin film.

The amounts of the anode active material, the conducting agent, the binder, and the solvent may be those levels that are generally used in the manufacture of lithium batteries in the art.

The electrolyte may be any of the electrolytes according to the above-described embodiments.

For example, the lithium battery may further include a separator and/or a lithium salt-containing non-aqueous electrolyte that are in common use in lithium batteries in the art, in addition to the electrolyte according to any of the above-described embodiments.

The separator may be an insulating thin film having high ion permeability and high mechanical strength. The separator may have a pore diameter of about 0.01 μm to about 10 μm, and a thickness of about 5 μm to about 20 μm. Examples of the separator are olefin polymers, such as polypropylene, and sheets or non-woven fabric made of glass fiber or polyethylene. When the electrolyte of the lithium battery is a solid polymer electrolyte, the solid polymer electrolyte may also serve as a separator.

The separator may be a monolayer or a multilayer including at least two layers of polyethylene, polypropylene, polyvinylidene fluoride, or a combination thereof. The multilayer may be a mixed multilayer. For example, the separator may be a two-layered separator including polyethylene and polypropylene layers, a three-layered separator including polyethylene, polypropylene and polyethylene layers, or a three-layered separator including polypropylene, polyethylene and polypropylene layers.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte.

The non-aqueous liquid electrolyte may include an organic solvent. The organic solvent may be any organic solvent available in the art. For example, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, dioxolane, 4-methyldioxolane, N,N-dimethyl formamide, N,N-dimethyl acetamide, N,N-dimethylsulfoxide, dioxane, 1,2-dimethoxyethane, sulfolane, dichloroethane, chlorobenzene, nitrobenzene, diethylene glycol, dimethyl ether, or a combination thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof.

In some embodiments, the lithium battery may have improved lifetime characteristics, and thus may be used in a battery cell for use as a power source of a small device, and may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but embodiments are not limited thereto.

The present disclosure will be described in further detail with reference to the following examples. These examples are for illustrative purposes only and are not intended to limit the scope of the present disclosure.

EXAMPLE 1

Preparation of Electrolyte (S:DVB:1,6-HD=4:1:4 Molar Ratio)

Styrene (also, referred to as "S"), 1,4-divinylbenzene (also, referred to as "DVB"), and 1,6-hexadiene (also, referred to as "1,6-HD") were mixed with PEO-CTA (having a weight average molecular weight of $10^4$ Daltons and a polydipersity (Mw/Mn) of about 1.11) represented by Formula 12 to prepare a monomer mixture. Here, an amount of PEO-CTA of the monomer mixture was about 35 percent by weight wt %, and a molar ratio of styrene, 1,4-divinylbenzene, and 1,6-hexadiene in the mixture was 4:1:4.

Formula 12

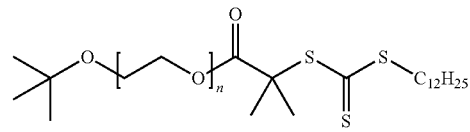

In Formula 12, n was controlled so that a weight average molecular weight of the polymer represented by Formula 12 was about $10^4$ Daltons.

N-methyl-N-propyl-pyrrolidinium bis(trifluoromethanesulfonyl)imide) [PYR13$^+$TFSI$^-$], which is an ionic liquid, and bis(trifluoromethylsulfonyl)imide (LiTFSI), which is a lithium salt, and polyethyleneglycol dimethylether (PEGDME) (having a weight average molecular weight of about 250 Daltons) were added and mixed to form the monomer mixture to prepare an electrolyte composition. In the composition, an amount of PEO-CTA was 35 percent by volume (vol %), the total amount of the monomers (styrene+1,4-divinylbenzene+1,6-hexadiene) was about 55 vol %, and the total amount of the ionic liquid and the lithium salt was about 10 vol %.

The molar ratio of the ionic liquid and the lithium salt in the mixture was 3:1, and the volume ratio of the ionic liquid and PEGDME in the mixture was 80:20.

Azobisisobutyronitrile (AIBN), which is a radical initiator, was added to the electrolyte composition, and a support substrate was coated with the mixture by using a doctor blade, the coated substrate was thermally treated at a temperature of 110° C. for 12 hours to perform polymerization, and thus an electrolyte including a block copolymer {PEO-b-(S-co-DVB-co-HD)} represented by Formula 1c was prepared. An amount of AIBN was about 0.05 mol based on 1 mol of PEO-CTA.

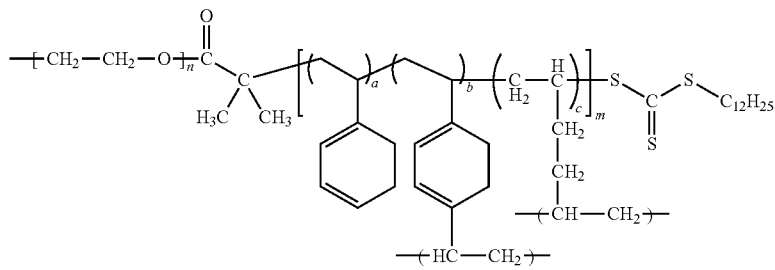

Formula 1c

In Formula 1c, m and n each denoted a degree of polymerization, n was controlled so that a weight average molecular weight of the ion conductive phase block (PEO block) was about $10^4$ Daltons, and m was controlled so that a weight average molecular weight of the block copolymer represented by Formula 1c was about 56,000 Daltons.

Also, a, b, and c each independently denoted a mole fraction, and the sum of a, b, and, c was 1, wherein a was about 0.44445, b was about 0.1111, and c was about 0.44445. In this regard, a ratio between a, b, and c was 4:1:4.

EXAMPLE 2

Preparation of Electrolyte (S:DVB:BA=2:1:2 Molar Ratio)

An electrolyte including a block copolymer {PEO-b-(S-co-DVB-co-BA)} represented by Formula 2a was prepared in the same manner as in Example 1, except that n-butyl acrylate was used instead of 1,6-hexadiene, and a molar ratio of styrene, 1,4-divinylbenzene, and n-butyl acrylate (wherein butyl acrylate is also referred to as "BA") in the mixture was 2:1:2 (styrene:DVB:BA=2:1:2 at a molar ratio), in the preparation of the monomer mixture.

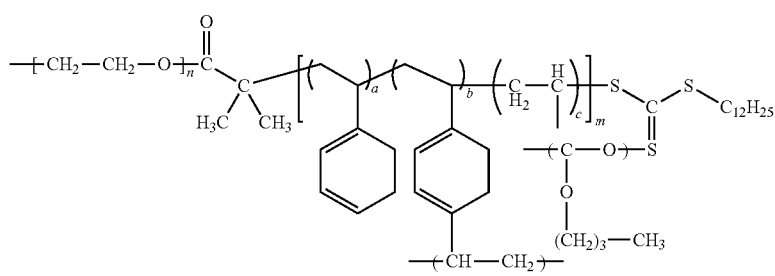

Formula 2a

In Formula 2a, n was controlled so that a weight average molecular weight of the ion conductive phase block (PEO block) was about $10^4$ Daltons, and m was controlled so that a weight average molecular weight of the block copolymer represented by Formula 2a was about 56,000 Daltons. Also, a, b, and c each independently denoted a mole fraction, and the sum of a, b, and, c was 1, wherein a was about 0.4, b was about 0.2, and c was about 0.4.

EXAMPLE 3

Preparation of Electrolyte (S:DVB:BA=2:1:4 Molar Ratio)

An electrolyte including a block copolymer {PEO-b-(S-co-DVB-co-BA)} represented by Formula 2a was prepared in the same manner as in Example 1, except that n-butyl acrylate was used instead of 1,6-hexadiene, and a molar ratio of styrene, 1,4-divinylbenzene, and n-BA in the mixture was 2:1:4, in the preparation of the monomer mixture.

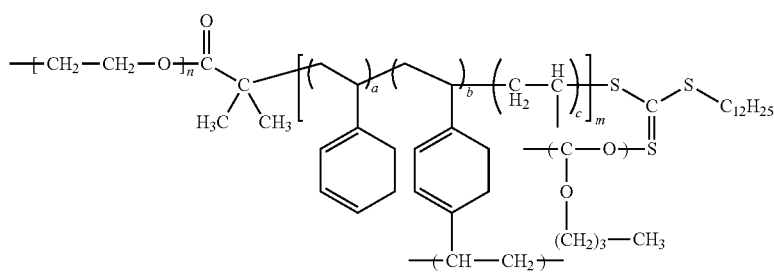

Formula 2a

In Formula 2a, n was controlled so that a weight average molecular weight of the ion conductive phase block (PEO block) was about $10^4$ Daltons, and m was controlled so that a weight average molecular weight of the block copolymer represented by Formula 2a was about 56,000 Daltons.

Also, a, b, and c each independently denoted a mole fraction, and the sum of a, b, and c was 1, wherein a was about 0.2857, b was about 0.1429, and c was about 0.5714. In this regard, a ratio between a, b, and c was 2:1:4.

EXAMPLE 4

Preparation of Electrolyte (S:DVB:1,6-HD=4:1:4 Molar Ratio)

An electrolyte was prepared in the same manner as in Example 1, except that a weight average molecular weight of PEO-CTA represented by Formula 12 was changed to about $10^3$ Daltons.

EXAMPLE 5

Preparation of Electrolyte (S:DVB:1,4-HD=4:1:4 Molar Ratio)

An electrolyte was prepared in the same manner as in Example 1, except that 1,4-butadiene (also, referred to as "1,4-HD") was used instead of 1,6-hexadiene in the preparation of the monomer mixture.

EXAMPLE 6

Preparation of Electrolyte

An electrolyte was prepared in the same manner as in Example 1, except that 4,4''-divinyl-5'-(4-vinylphenyl)-1,1': 3',1''-terphenyl was used instead of 1,4-divinylbenzene in the preparation of the monomer mixture.

EXAMPLE 7

Preparation of Electrolyte

An electrolyte was prepared in the same manner as in Example 1, except that a compound represented by Formula 10a was used instead of 1,6-hexadiene in the preparation of the monomer mixture.

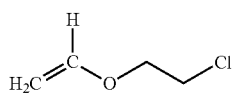

Formula 10a

EXAMPLE 8

Preparation of Electrolyte (S:DVB:BA=1:1:4)

An electrolyte including a block copolymer {PEO-b-(S-co-DVB-co-BA)} represented by Formula 1c was prepared in the same manner as in Example 1, except that n-butyl acrylate was used instead of 1,6-hexadiene, and a molar ratio of styrene, 1,4-divinylbenzene, and n-butyl acrylate was 1:1:4 in the preparation of the monomer mixture.

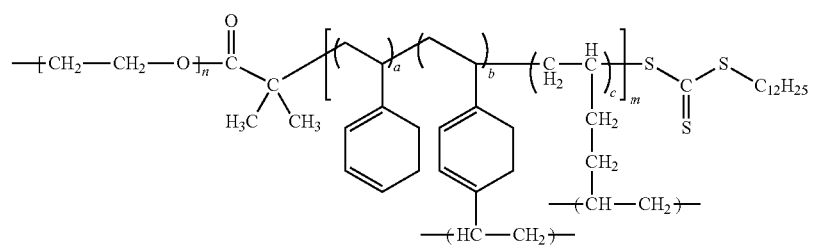

Formula 1c

In Formula 1c, m and n each denoted a degree of polymerization, n was controlled so that a weight average molecular weight of the ion conductive phase block (PEO block) was about $10^4$ Daltons, and m was controlled so that a weight average molecular weight of the block copolymer represented by Formula 1c was about 56,000 Daltons.

Also, a, b, and c each independently denoted a mole fraction, and the sum of a, b, and c was 1, wherein a was about 0.16665, b was about 0.16665, and c was about 0.6667. In this regard, a ratio between a, b, and c was 1:1:4.

COMPARATIVE EXAMPLE 1

Preparation of Electrolyte (Structure) (S:DVB=4:1 at Molar Ratio)

A polymer composition was prepared by mixing styrene and 1,4-divinylbenzene to PEO-CTA (having a weight average molecular weight of about $10^4$ Daltons and a polydipersity (Mw/Mn) of about 1.11) represented by Formula 12. In the polymer composition, an amount of PEO-CTA was about 35 wt %, and a molar ratio of styrene and 1,4-divinylbenzene was 4:1.

Formula 12

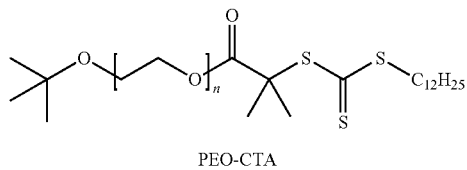

PEO-CTA

In Formula 12, n was controlled so that a weight average molecular weight of PEO-CTA represented by Formula 12 was about $10^4$ Daltons.

Azobisisobutyronitrile (AIBN), which is a radical initiator, was added to the polymer composition and thermally treated at a temperature of about 100° C. for 3 hours to perform polymerization, and thus an electrolyte (structure) including a block copolymer {PEO-b-(S-co-DVB)} was prepared. An amount of AIBN was about 0.05 mol based on 1 mol of PEO-CTA.

COMPARATIVE EXAMPLE 2

Preparation of Electrolyte (S:DVB=4:1 at Molar Ratio)

An electrolyte was prepared in the same manner as in Comparative Example 1, except that 1-butyl-3-methylimidazolium bis(trifluoromethanesulfonyl)imide (BMIPTFSI) represented by Formula 13, which is an ionic liquid, bis(trifluoromethylsulfonyl)imide (LiTFSA) represented by Formula 14, which is a lithium salt, and polyethyleneglycoldimethylether (PEGDME) (having a number average molecular weight of about 250 Daltons) were added to the polymer composition. A molar ratio of the ionic liquid and the lithium salt was 3:1, and a molar ratio of the ionic liquid and PEGDME was 80:20.

Formula 13

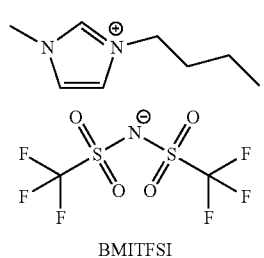

BMITFSI

Formula 14

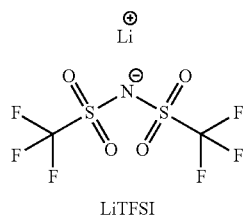

LiTFSI

COMPARATIVE EXAMPLE 3

Preparation of Electrolyte

An electrolyte was prepared in the same manner as in Comparative Example 1, except that N-methyl-N-propyl-pyrrolidinium bis(trifluoromethanesulfonyl)imide [PYR13+TFSI-], which is an ionic liquid, bis(trifluoromethylsulfonyl)imide (LiTFSA), which is a lithium salt, and polyethyleneglycoldimethylether (PEGDME) (having a number average molecular weight of about 250 Daltons) were added to the polymer composition. A molar ratio of the ionic liquid and the lithium salt was 3:1, and a volume ratio of the ionic liquid and PEGDME was 80:20.

COMPARATIVE EXAMPLE 4

Preparation of Electrolyte (BA:DVB=4:1 at Molar Ratio)

A polymer composition was prepared by mixing n-butyl acrylate and divinylbenzene to PEO-CTA (having a weight average molecular weight of about $10^4$ Daltons and a polydipersity (Mw/Mn) of about 1.11). An amount of PEO-CTA in the polymer composition was about 35 wt %, and a molar ratio of n-butyl acrylate and 1,4-1,4-divinylbenzene was about 4:1.

Formula 12

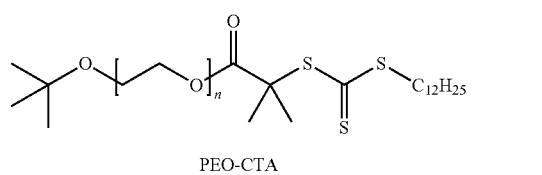

PEO-CTA

In Formula 12, n was controlled so that a weight average molecular weight of PEO-CTA represented by Formula 12 was about $10^4$ Daltons.

Azobisisobutyronitrile (AIBN), which is a radical initiator, was added to the polymer composition and thermally treated at a temperature of about 100° C. for 3 hours to perform polymerization, and thus an electrolyte (structure) including a block copolymer {PEO-b-(BA-co-DVB)} was prepared. An amount of AIBN was about 0.05 mol based on 1 mol of PEO-CTA.

MANUFACTURE EXAMPLE 1

Manufacture of Lithium Battery (Coin Cell)

A mixture prepared by mixing LiCoO$_2$, a carbon conducting agent (Denka Black), and polyvinylidenefluoride (PVdF) at weight ratio of 92:4:4 was mixed with N-methylpyrrolidone (NMP) by using an agate mortar and pestle to prepare a slurry. The slurry was bar-coated on an aluminum current collector having a thickness of 15 µm, dried at room temperature (25° C.), dried again under the condition of vacuum at 120° C., and then pressed and punched to prepare a cathode having a thickness of 55 µm.

The cathode was wet with polyethyleneglycoldimethylether (PEGDME) (having a weight average molecular weight of about 250 Daltons) for 1 hour. The electrolyte prepared in Example 1 was disposed between the wetted cathode and a lithium metal thin film to manufacture a coin cell.

MANUFACTURE EXAMPLES 2 to 7

Manufacture of Lithium Battery (Coin Cell)

Coin cells were manufactured in the same manner as in Manufacture Example 1, except that the electrolytes prepared in Examples 2 to 7 were respectively used instead of the electrolyte prepared in Example 1.

MANUFACTURE EXAMPLE 8

Manufacture of Lithium Secondary Battery (Full Cell)

First, an electrolyte composition was prepared as follows.
Styrene, 1,4-divinylbenzene (DVB), and n-butylacrylate at a molar ratio of 4:4:1 were mixed to PEO-CTA (having a weight average molecular weight of about $10^4$ Daltons and a polydipersity of about 1.11) represented by Formula 12 to prepare a monomer mixture. An amount of PEO-CTA in the monomer mixture was about 35 wt %, and a molar ratio of styrene, 1,4-divinylbenzene, and n-butylacrylate was 2:1:2.

Formula 12

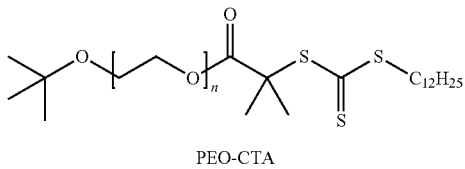

PEO-CTA

In Formula 12, n was controlled so that a weight average molecular weight of PEO-CTA represented by Formula 12 was about $10^4$ Daltons.

N-methyl-N-propyl-pyrrolidinium bis(trifluorosulfonyl)imide) [PYR13$^+$TFSI$^-$], which is an ionic liquid, bis(trifluoromethylsulfonyl)imide (LiTFSI), which is a lithium salt, and polyethyleneglycoldimethylether (PEGDME) (having a weight average molecular weight of about 250 Daltons) were added to the monomer mixture, azobisisobutyronitrile (AIBN), which is a radial initiator, was added thereto, and stirred at room temperature (25° C.) to prepare an electrolyte composition. In the composition, an amount of PEO-CTA was about 35 vol %, the total amount of the monomers was about 55 vol %, and the total amount of the ionic liquid and the lithium salt was about 10 vol %.

The molar ratio of the ionic liquid and the lithium salt was 3:1, and the volume ratio of the ionic liquid and PEGDME was 80:20.

The electrolyte composition was coated on a lithium metal thin film (having a thickness of about 20 µm) by using a doctor blade, and the coated thin film was dried in a vacuum oven at about 110° C. for about 12 hours to prepare a lithium metal anode having an electrolyte (an anode protective layer) having a thickness of about 17 µm.

LiCoO$_2$, a conducting agent (Super-P, available from Timcal Ltd.), polyvinylidene fluoride (PVdF), and N-pyrrolidone were mixed together to obtain a cathode composition. A mixed weight ratio of LiCoO$_2$, the conducting agent, and PVDF in the cathode composition was about 97:1.5:1.5.

The cathode composition was coated on an aluminum foil having a thickness of about 15 µm), dried at about 25° C., and then dried further at about 110° C. in vacuum, thereby manufacturing a cathode.

The lithium metal anode including the electrolyte (anode protective layer) was disposed on the cathode, and a separator was disposed between the cathode and the electrolyte, thereby to manufacture a lithium secondary battery (having a structure of cathode/separator/electrolyte (anode protective layer)/anode). The separator used was PVDF-4 (Cheil Industries).

A liquid electrolyte was further added between the cathode and the electrolyte of the lithium secondary battery. The liquid electrolyte was obtained by dissolving 1.3 M LiPF$_6$ in a mixed solvent of ethylene carbonate (EC), propylenecarbonate (PC), and fluoroethylenecarbonate (FEC) in a volume ratio of about 2:6:2.

MANUFACTURE EXAMPLE 9

Manufacture of Lithium Secondary Battery (Full Cell)

Lithium secondary batteries were manufactured in the same manner as in Manufacture Example 8, except that a liquid electrolyte prepared as follows was used instead of the liquid electrolyte prepared in Manufacture Example 8.

The liquid electrolyte was prepared by adding a lithium salt, in which 1 M of LiTFSI was dissolved, to a mixed solvent of polyethyleneglycol dimethyl ether (PEGDME), fluoroethylenecarbonate (FEC), and trimethyl phosphate (TMP) at a volume ratio of 8:2:1. Also, 2 parts by weight of lithium bis(oxalate)borate (LiBOB) with respect to 100 parts by weight of bis(trifluoromethylsulfonyl)imide (LiTFSI) was added thereto.

COMPARATIVE MANUFACTURE EXAMPLE 1

Manufacture of Coin Cell

A mixture prepared by mixing LiCoO$_2$, a carbon conducting material (Denka Black), and polyvinylidenefluoride (PVdF) at weight ratio of 92:4:4 was mixed with N-methylpyrrolidone (NMP) by using an agate mortar and pestle to prepare a slurry. The slurry was bar-coated on an aluminum current collector having a thickness of 15 µm, dried at room temperature, dried again under the condition of vacuum at 120° C., and then pressed and punched to prepare a cathode having a thickness of 55 µm.

The cathode was wet with polyethylene glycol dimethyl ether (PEGDME) (having a weight average molecular weight of about 250 Daltons) for 1 hour. The electrolyte prepared in Comparative Example 1 and a mixture of an ionic liquid and a lithium salt were disposed between the wetted cathode and a lithium metal thin film, which is a counter electrode, to manufacture a coin cell.

The ionic liquid was 1-butyl-3-methylimidazolium bis(trifluoromethanesulfonyl)imide (BMIPTFSI), and the lithium salt was bis(trifluoromethylsulfonyl)imide (LiTFSI).

In the liquid electrolyte, the weight ratio of BMIPTFSI and LiTFSI was 3:1, and the volume ratio of BMIPTFSI and PEGDME was 80:20.

COMPARATIVE MANUFACTURE EXAMPLE 2

Manufacture of Coin Cell

A mixture prepared by mixing LiCoO$_2$, a carbon conducting material (Denka Black), and polyvinylidenefluoride (PVdF) at weight ratio of 92:4:4 was mixed with N-methylpyrrolidone (NMP) by using an agate mortar and pestle to prepare a slurry. The slurry was bar-coated on an aluminum current collector having a thickness of 15 μm, dried at room temperature, dried again under the condition of vacuum at 120° C., and then pressed to prepare a cathode having a thickness of 55 μm.

The cathode was wet with polyethylene glycol dimethyl ether (PEGDME) (having a weight average molecular weight of about 250 Daltons) for 1 hour. The electrolyte prepared in Comparative Example 2 was disposed between the wetted cathode and a lithium metal thin film, which is a counter electrode, to manufacture a coin cell.

COMPARATIVE MANUFACTURE EXAMPLE 3

Manufacture of Coin Cell

A coin cell was manufactured in the same manner as in Comparative Manufacture Example 2, except that the electrolyte prepared in Comparative Example 3 was used instead of the electrolyte prepared in Comparative Example 2.

COMPARATIVE MANUFACTURE EXAMPLE 4

Manufacture of Lithium Secondary Battery (Full Cell)

A lithium secondary battery was prepared in the same manner as in Manufacture Example 9, except that an anode protective layer was not formed on a lithium anode thin film, and a thickness of the lithium anode thin film was changed to about 40 μm.

EVALUATION EXAMPLE 1

Conductivity Measurement

1) Examples 1 and 2 and Comparative Example 1

Conductivities of the electrolytes prepared in Examples 1 and 2 and Comparative Example 1 were measured at 25° C. as follows.

Figure 2A:
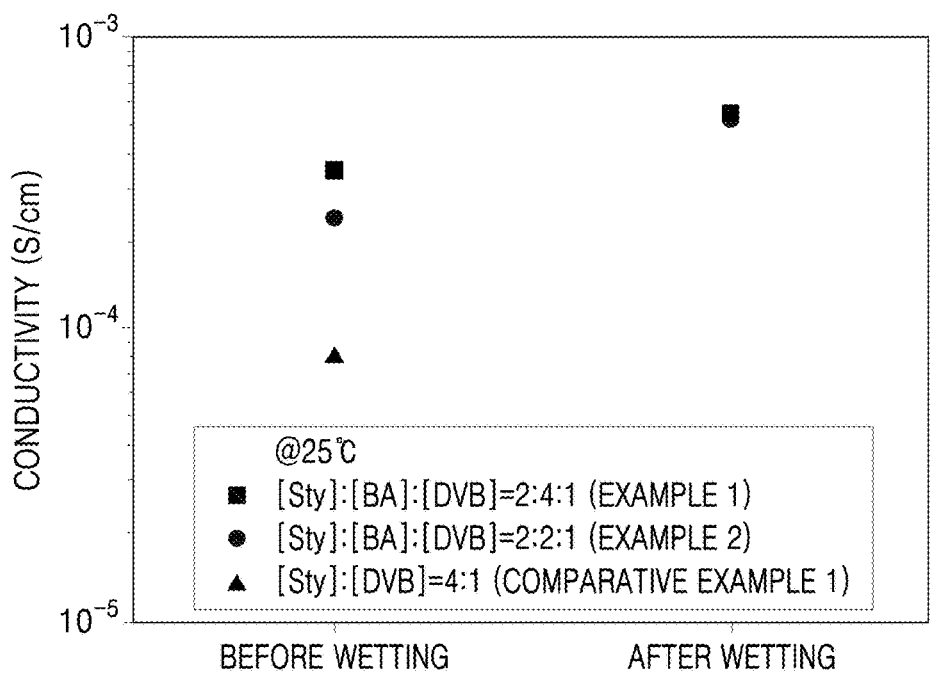
FIG. 2A is a diagram of conductivity (Siemens per centimeter, S/cm) showing the results of ion conductivity evaluation on electrolytes prepared in Examples 1 and 2 and Comparative Example 1.

The resistance of each of the electrolytes of Examples 1 and 2 and Comparative Example 1 was measured while scanning temperature thereof with a bias voltage of about 10 milli Volts (mV) in a frequency range of about 1 Hertz (Hz) to about 1 mega Hertz (MHz) to evaluate an ionic conductivity thereof, and the results are shown in FIG. 2A. In FIG. 2A, "before wetting" refers to a state of the electrolyte before wetting with polyethyleneglycol dimethyl ether (PEGDME) (having a weight average molecular weight of about 250 Daltons) for about 1 hour, and "after wetting" refers to a state of the electrolyte after wetting with polyethyleneglycoldimethylether (PEGDME) for about 1 hour.

Referring to FIG. 2A, it may be understood that conductivities of the electrolytes prepared in Examples 1 and 2 improved compared to that of the electrolyte prepared in Comparative Example 1.

2) Examples 2, 3, and 8 and Comparative Examples 1 and 4

Ion conductivities of the electrolytes prepared in Examples 2, 3, and 8 and Comparative Examples 1 and 4 were measured at 25$t$ as follows.

Figure 2B:
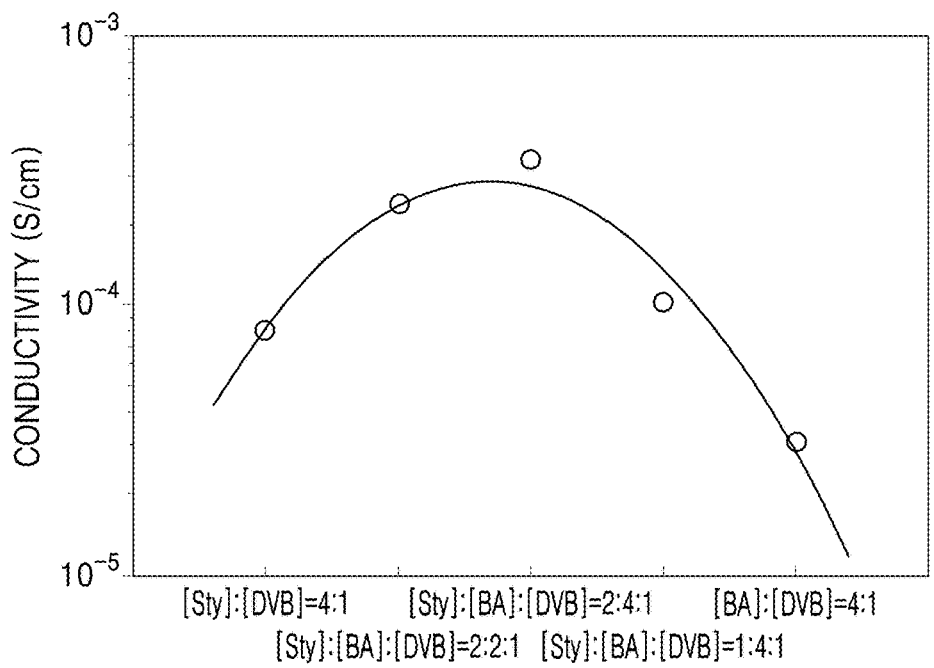
FIG. 2B is a diagram of conductivity (Siemens per centimeter, S/cm) showing the results of ion conductivity evaluation of electrolytes prepared in Examples 2, 3, and 8 and Comparative Examples 1 and 4.

The resistance of each of the electrolytes of Examples 2, 3, and 8 and Comparative Examples 1 and 4 was measured while scanning temperature thereof with a bias voltage of about 10 mV in a frequency range of about 1 Hz to about 1 MHz to evaluate an ionic conductivity thereof, and the results are shown in FIG. 2B.

Referring to FIG. 2B, it may be understood that conductivities of the electrolytes prepared in Examples 2, 3, and 8 improved compared to those of the electrolytes prepared in Comparative Examples 1 and 4.

EVALUATION EXAMPLE 2

Electrochemical Stability

The electrolyte of Example 1 was disposed between a lithium electrode and a stainless steel (SUS) electrode to manufacture a cell. Electrochemical stability of the cell was analyzed by linear sweep voltammetry (LSV), and the results are shown in FIG. 3.

The measurement conditions for LSV were as follows: a voltage range of about 3 Volts (V) to about 7 V, a scan rate of about 0.5 milli Volts per second (mV/s), and a temperature of about 25° C.

Figure 3:
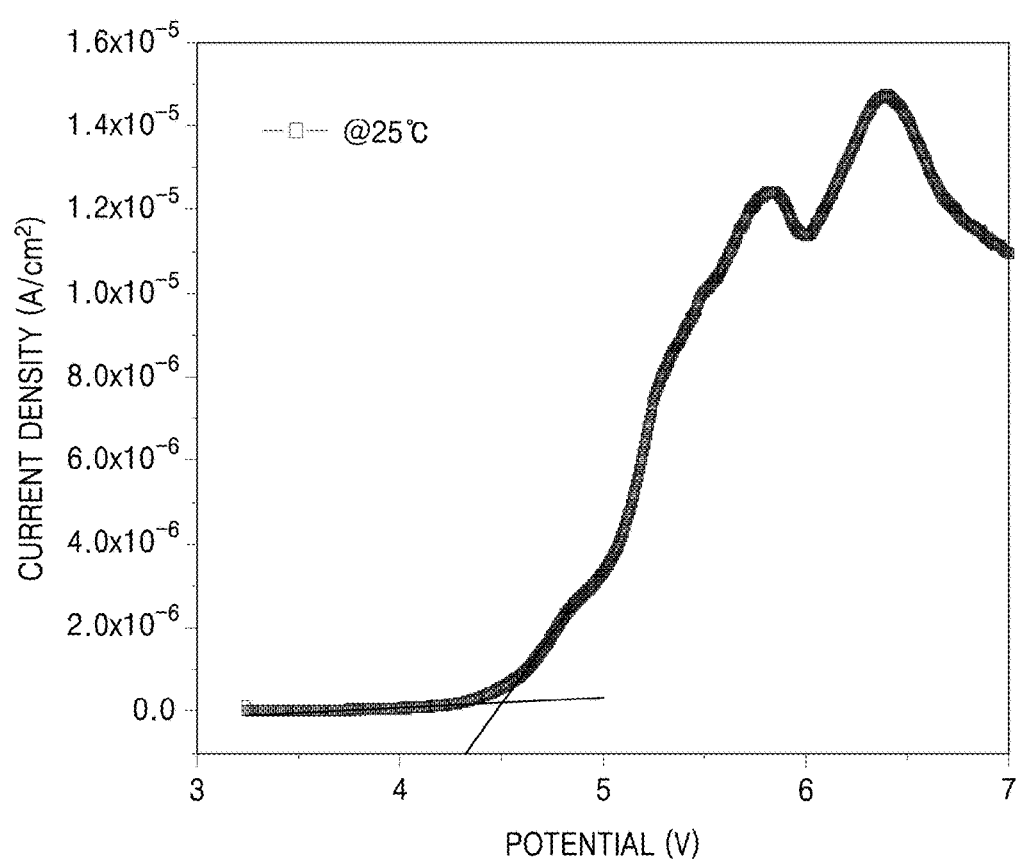
FIG. 3 is a graph of current (Amperes per square centimeter, $A/cm^2$) versus potential (Volts, V) showing the results of linear sweep voltammetry (LSV) analysis of the electrolyte prepared in Example 1.

Referring to FIG. 3, it may be understood that electrochemical stability of the cell including the electrolyte of Example 1 improved up to a voltage of 4.5 V.

EVALUATION EXAMPLE 3

Impedance Measurement

1) Manufacture Example 1 and Comparative Manufacture Example 1

Impedances of the coin cells of Manufacture Example 1 and Comparative Manufacture Example 1 after charging/discharging electrodes of the coin cells at 25° C. by using an AC impedance method. When measuring the impedances, an impedance analyzer was Solatron SI1260 impedance/gain-phase analyzer, and the measurement method was a 4-probe method.

Figure 4A:
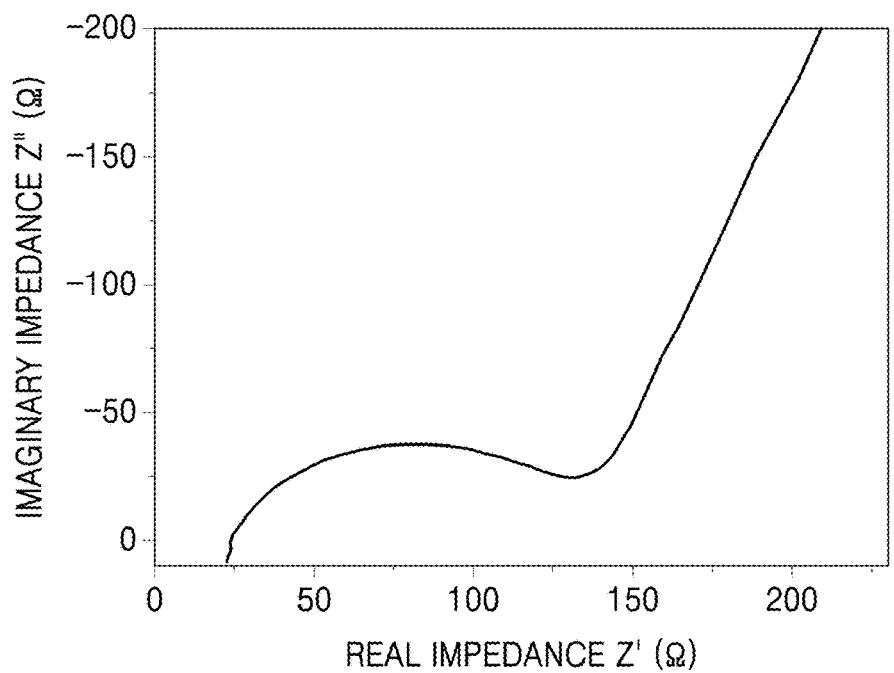
FIG. 4A is a graph of negative imaginary impedance (Ohms, $\Omega$) versus real impedance (Ohms, $\Omega$) showing the results of impedance measurement on coin cells prepared in Manufacture Example 1 and Comparative Manufacture Example 1.
Figure 4B:
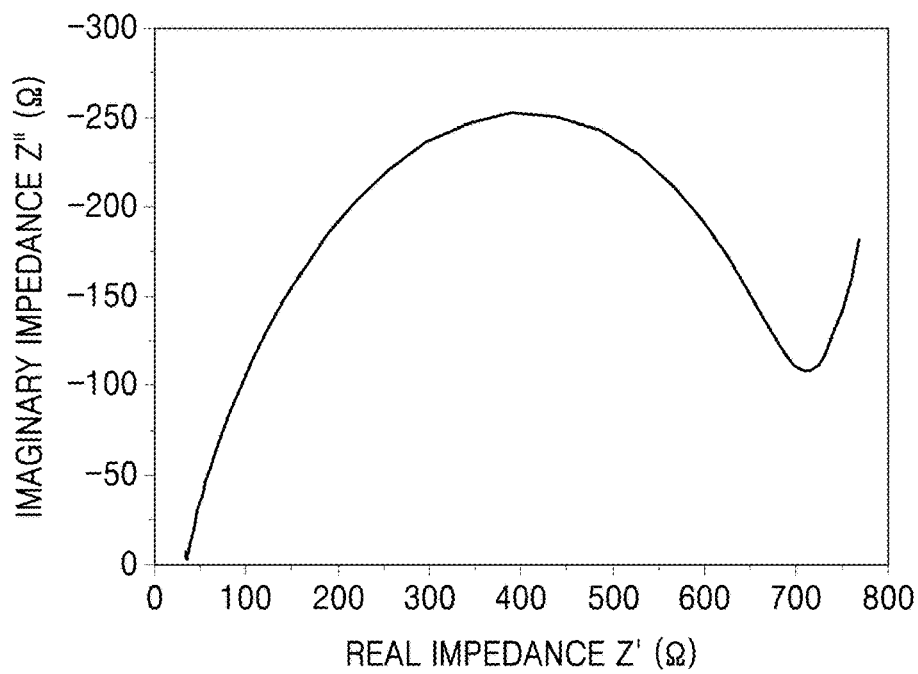
FIG. 4B is a graph of negative imaginary impedance (Ohms, $\Omega$) versus real impedance (Ohms, $\Omega$) showing the results of impedance measurement on the coin cell prepared in Comparative Manufacture Example 1.

The impedance measurement results of the coin cells prepared in Manufacture Example 1 and Comparative Manufacture Example 1 are shown in FIGS. 4A and 4B.

Referring to FIGS. 4A and 4B, it may be understood that impedance characteristics of the cell prepared in Manufacture Example 1 significantly improved compared to that of the cell prepared in Comparative Manufacture Example 1.

1) Manufacture Example 2 and Comparative Manufacture Example 2

Figure 4C:
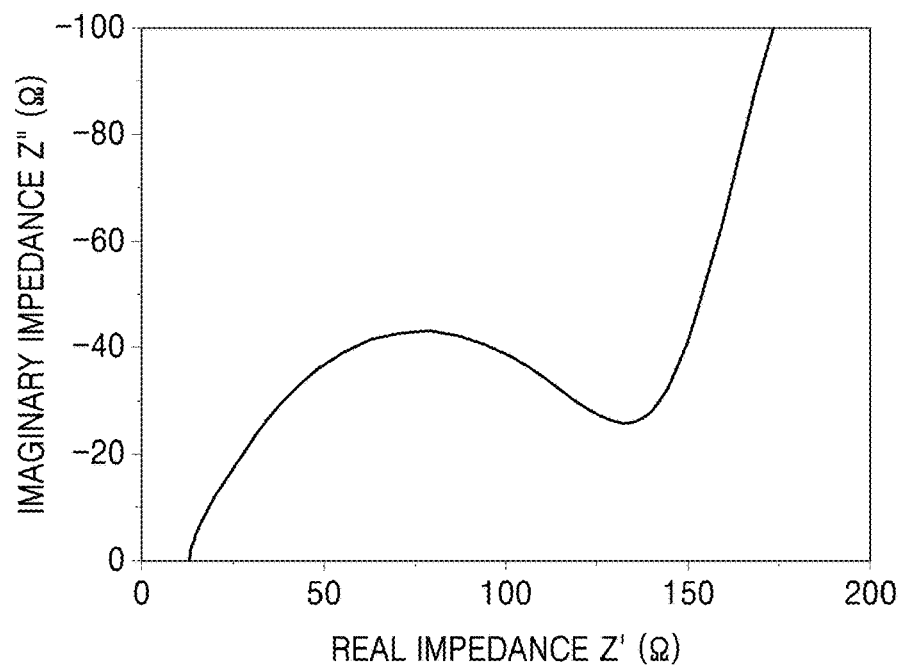
FIG. 4C is a graph of negative imaginary impedance (Ohms, $\Omega$) versus real impedance (Ohms, $\Omega$) showing the results of impedance measurement on a coin cell prepared in Manufacture Example 2.
Figure 4D:
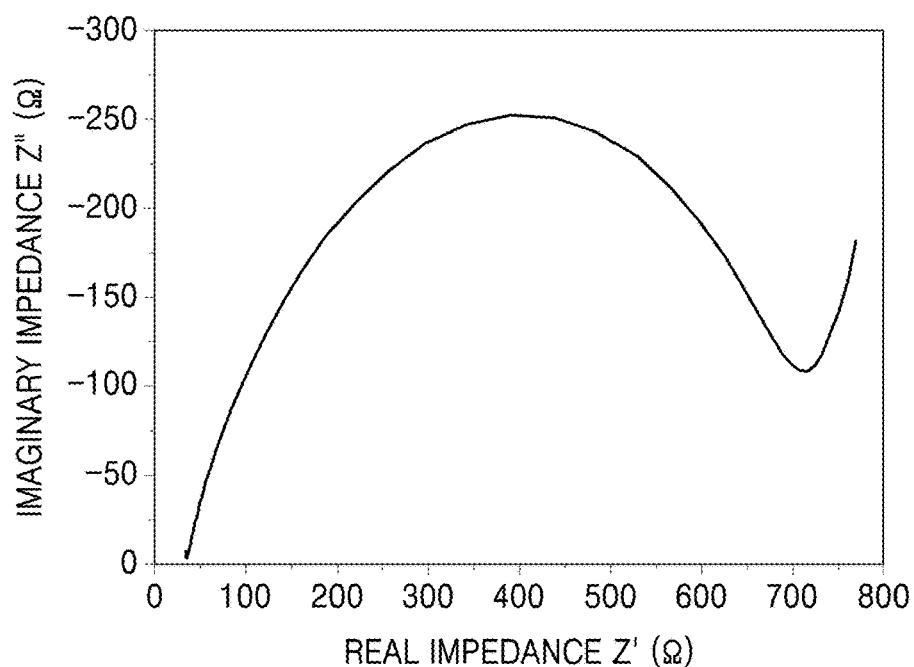
FIG. 4D is a graph of negative imaginary impedance (Ohms, $\Omega$) versus real impedance (Ohms, $\Omega$) showing the results of impedance measurement on a coin cell prepared in Comparative Manufacture Example 2.

Impedances of the coin cells of Manufacture Example 2 and Comparative Manufacture Example 2 were measured in the same manner as in the measurement of the impedances of the coin cells of Manufacture Example 1 and Comparative Manufacture Example 1, and the results are shown in FIGS. 4C and 4D.

Referring to FIGS. 4C and 4D, it may be understood that impedance characteristics of the cell prepared in Manufacture Example 2 (see FIG. 4C) improved compared to that of the cell prepared in Comparative Manufacture Example 2 (see FIG. 4D).

EVALUATION EXAMPLE 4

Charging Profile

The coin cells prepared in Manufacture Example 1 and Comparative Manufacture Example 3 were charged with a constant current of 0.05 Coulombs (C) at 25° C. up to a voltage of 4.3 V.

Figure 5A:
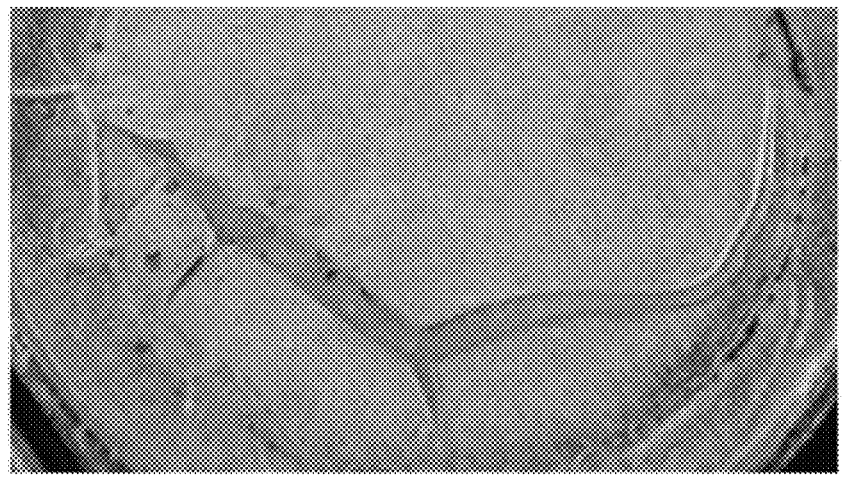
FIG. 5A is an image of an electrolyte after charging/discharging a coin cell prepared in Comparative Manufacture Example 3.

While the cells were charged, the electrolytes in the coin cells of Manufacture Example 1 and Comparative Manufacture Example 3 were observed whether cracks were found therefrom or not, and the results are shown in FIG. 5A.

As shown in FIG. 5A, cracks were found from the electrolyte of the coin cell of Comparative Manufacture Example 3.

Figure 5B:
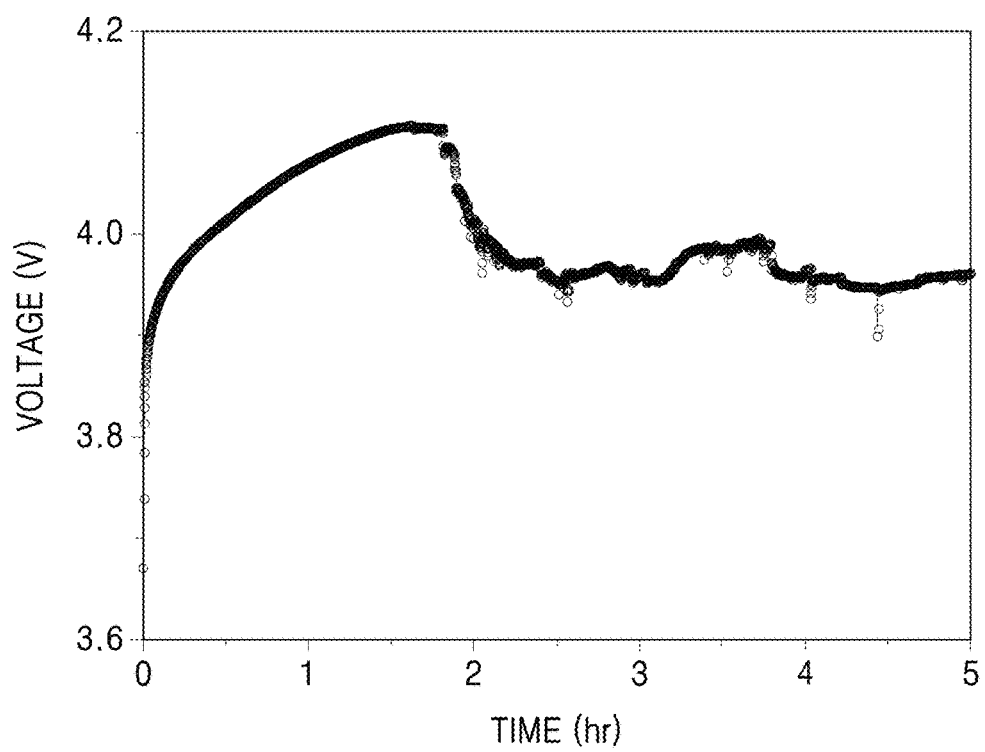
FIG. 5B is graph of Voltage (Volts, V) versus time (hours, h), which is a charging profile of the coin cell prepared in Comparative Manufacture Example 3 after a charging process.

Also, charging profiles of the coin cells of Manufacture Example 1 and Comparative Manufacture Example 3 after the charging/discharging process were evaluated. FIG. 5B shows the charging profile of the coin cell of Comparative Manufacture Example 3.

A potential of the coin cell prepared in Manufacture Example 1 maintained constant, but, as shown in FIG. 5B, a potential of the coin cell prepared in Comparative Manufacture Example 3 continuously decreased, and thus it may be understood that the coin cell prepared in Comparative Manufacture Example 3 was not charged.

EVALUATION EXAMPLE 5

Charging/Discharging Characteristics

1) Manufacture Example 1, Comparative Manufacture Example 1, and Comparative Manufacture Example 2

Charging/discharging was performed on the coin cells prepared in Manufacture Example 1, Comparative Manufacture Example 1, and Comparative Manufacture Example 2.

Each of the coin cells of Manufacture Example 1, Comparative Manufacture Example 1, and Comparative Manufacture Example 2 was subjected to 50 cycles of charging and discharging at room temperature (about 20-25° C.) in a voltage range of about 3.0 V to about 4.4 V (with respect to lithium metal) at a constant current of about 0.1° C. The charging/discharging process was repeated 4 times.

Figure 6A:
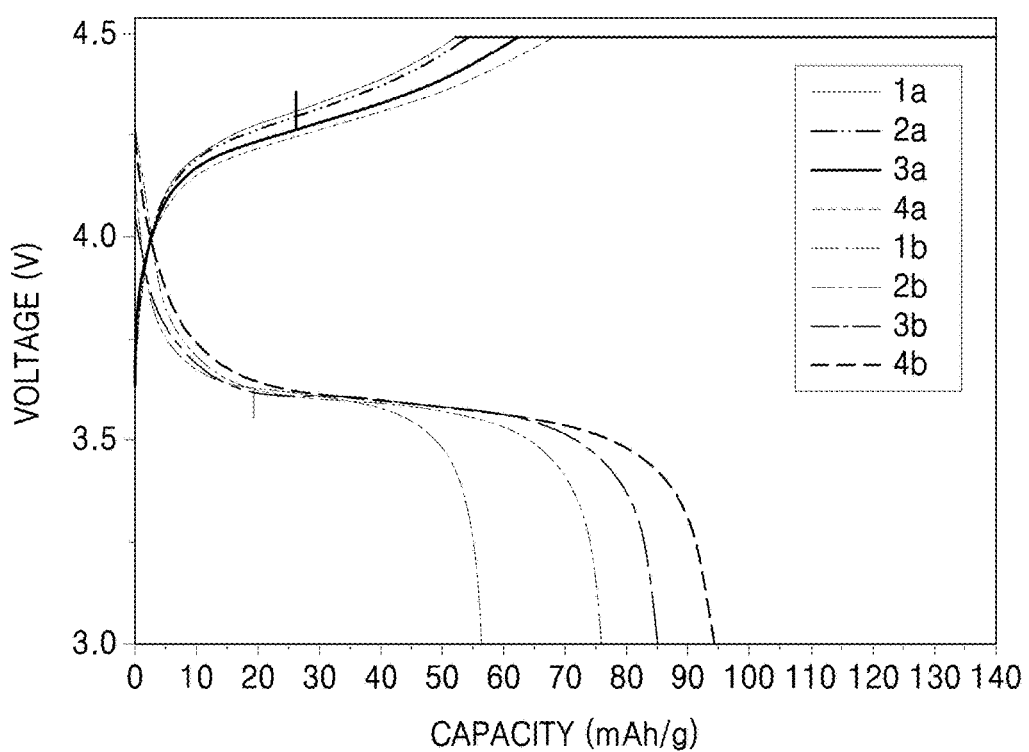
FIGS. 6A to 6C are graphs of voltage (Volts, V) versus capacity (milli Ampere hours per gram, mA-h/g) showing a potential change according to a capacity after charging/ discharging the coin cells prepared in Manufacture Example 1, Comparative Manufacture Example 1, and Comparative Manufacture Example 2.
Figure 6B:
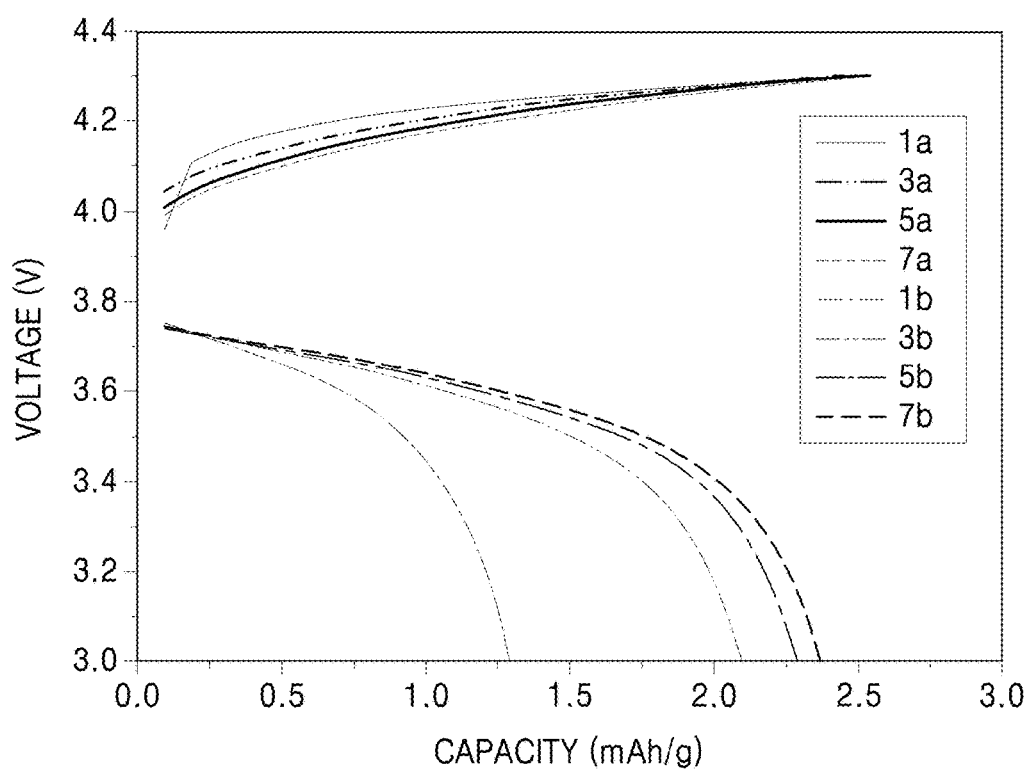
Figure 6C:
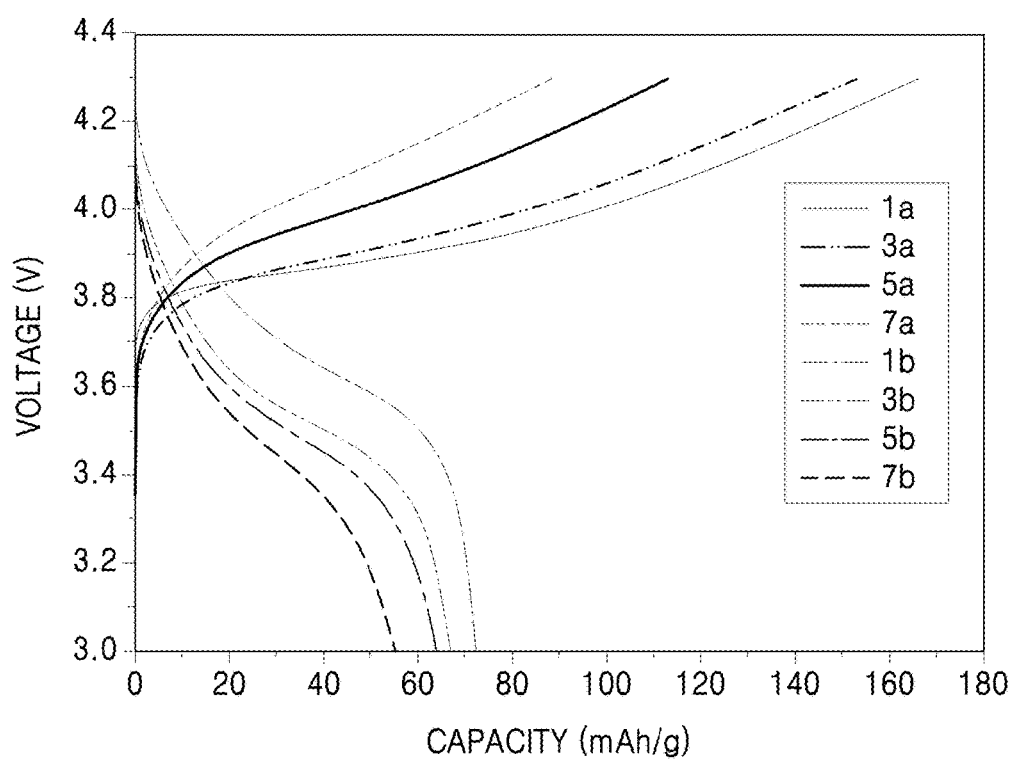

After performing the charging/discharging process, potential changes according to the capacity are shown in FIGS. 6A to 6C.

In FIG. 6A, $1a$, $2a$, $3a$, and $4a$ each respectively show $1^{st}$ cycle, $2^{nd}$ cycle, $3^{rd}$ cycle, and $4^{th}$ cycle charging graphs, and $1b$, $2b$, $3b$, and $4b$ each respectively show $1^{st}$ cycle, $2^{nd}$ cycle, $3^{rd}$ cycle, and $4^{th}$ cycle discharging graphs. Also, in FIGS. 6B and 6C, $1a$, $3a$, $5a$, and $7a$ each respectively show $1^{st}$ cycle, $3^{rd}$ cycle, $5^{th}$ cycle, and $7^{th}$ cycle charging graphs, and $1b$, $3b$, $5b$, and $7b$ each respectively show $1^{st}$ cycle, $3^{rd}$ cycle, $5^{th}$ cycle, and $7^{th}$ cycle discharging graphs.

Charging/discharging characteristics of the coin cells prepared in Comparative Manufacture Examples 1 and 2 were performed in the same manner as in evaluation of charging/discharging characteristics of the coin cell prepared in Manufacture Example 1, except that the charging/discharging process was repeated 7 times to evaluate the charging/discharging characteristics of the coin cells prepared in Comparative Manufacture Examples 1 and 2.

The results of the charging/discharging characteristics of the coin cell prepared in Manufacture Example 1 and the coin cells prepared in Comparative Manufacture Examples 1 and 2 are each respectively shown in FIGS. 6A to 6C.

In this regard, it may be understood that the coin cell prepared in Manufacture Example 1 improved compared to that of the coin cells prepared in Comparative Manufacture Examples 1 and 2.

2) Manufacture Examples 2 to 7

Charging/discharging characteristics of the coin cells prepared in Manufacture Examples 2 to 7 were evaluated, and the results of the evaluation performed on the coin cell prepared in Manufacture Example 2 are shown in FIG. 7.

Referring to FIG. 7, it may be understood that the charging/discharging characteristics of the coin cell prepared in Manufacture Example 2 are better than those of the coin cell prepared in Comparative Manufacture Example 1 and Comparative Manufacture Example 2 shown in FIGS. 6B and 6C. Also, it may be understood that the coin cells prepared in Manufacture Examples 3 to 7 had good charging/discharging characteristics as well as those of the coin cell prepared in Manufacture Example 2.

3) Manufacture Example 8

The lithium secondary battery prepared in Manufacture Example 8 was subjected to 55 cycles of charging and discharging at room temperature (about 20-25° C.) in a voltage range of about 3.0 V to about 4.4 V (with respect to lithium metal) at a constant current of about 0.1° C. The results of the charging/discharging test during the $1^{st}$, $5^{th}$, $10^{th}$, $20^{th}$, $40^{th}$, and $50^{th}$ cycles are shown in FIGS. 8 and 9. FIG. 8 is a graph showing a capacity and efficiency change according to the number of cycles, and FIG. 9 shows a voltage change according to a capacity.

The efficiency shown in FIG. 8 is calculated according to Equation 1.

Efficiency(%)=(discharge capacity/charge capacity)× 100     Equation 1

Referring to FIG. 8, it may be understood that the lithium secondary battery prepared in Manufacture Example 8 had excellent charging/discharging efficiency and capacity retention rate. Also, referring to FIG. 9, it may be understood that the lithium secondary battery prepared in Manufacture Example 8 had excellent cycle characteristics.

4) Manufacture Example 9 and Comparative Manufacture Example 4

The lithium secondary batteries prepared in Manufacture Example 9 and Comparative Manufacture Example 4 were subjected to 10 cycles of charging and discharging at room temperature (about 20-25° C.) in a voltage range of about 3.0 V to about 4.3 V (with respect to lithium metal) at a constant current of about 0.1° C. The lithium secondary batteries were subjected to the next 10 cycles of charging and discharging in a voltage range of about 3.0 V to about 4.3 V at a constant current of about 0.2° C. Then, the lithium secondary batteries were subjected to the next 10 cycles of charging and discharging in a voltage range of about 3.0 V to about 4.3 V at a constant current of about 0.1° C. Capacity characteristics of the lithium secondary batteries according to the number of cycles are shown in FIG. 10. In FIG. 10, PIPS is related to Manufacture Example 4, and Bare Li is related to Comparative Manufacture Example 4.

Referring to FIG. 10, it may be understood that the lithium secondary battery prepared in Manufacture Example 9 had excellent cycle characteristics compared to that of the lithium secondary battery prepared in Comparative Manufacture Example 4.

EVALUATION EXAMPLE 6

Modulus of Elasticity (Young's Modulus) and Tensile Strength

Modulus of elasticity (Young's modulus) and maximum tensile strength of the electrolytes prepared in Examples 2 and 3 and Comparative Example 1 were measured by using Lloyd LR-10K, and electrolyte samples were prepared by using ASTM standard D638 (Type V specimens).

Tensile strength of the electrolytes was measured at 25° C., about 30% of a relative humidity at a rate of 5 millimeters (mm) per minute.

The results of measuring the modulus of elasticity and tensile strength are shown in Table 1.

TABLE 1

|           | Modulus of elasticity (Young's modulus) (MPa) | Tensile strength (MPa) |
|-----------|-----------------------------------------------|------------------------|
| Example 2 | 12.4                                          | 1.6                    |
| Example 3 | 1129                                          | 18.3                   |

TABLE 1-continued

| | Modulus of elasticity (Young's modulus) (MPa) | Tensile strength (MPa) |
|---|---|---|
| Comparative Example 1 | 0.081 | 6.1 |

Referring to Table 1, it may be confirmed that the electrolyte prepared in Example 3 had improved mechanical properties as its modulus of elasticity and tensile strength improved compared to that of the electrolyte prepared in Comparative Example 1. Also, the electrolyte prepared in Example 2 had an increased modulus of elasticity compared to that of the electrolyte prepared in Comparative Example 1. Although the tensile strength of the electrolyte prepared in Example 2 was lower than that of the electrolyte prepared in Comparative Example 1, it may be confirmed that the tensile strength of the electrolyte prepared in Example 2 was appropriate to be used as an electrolyte (about 0.1 milli Siemens per centimeter (mS/cm) or higher). In this regard, the electrolytes prepared in Examples 2 and 3 had excellent mechanical properties.

Also, modulus of elasticity and tensile strength properties of the electrolyte prepared in Example 1 were the same with those of the electrolytes prepared in Examples 2 and 3.

EVALUATION EXAMPLE 7

Scanning Electron Microscopic (SEM) Analysis

A co-continuous domain size of each of the electrolytes prepared in Examples 1 to 8 was evaluated by performing analysis using a scanning electron microscope.

The electrolytes prepared in Examples 1 to 8 had co-continuous domain sizes that were about 1 μm or greater.

As described above, according to the one or more of the above exemplary embodiments, mechanical properties of an electrolyte improve. When the electrolyte is included, a cycle efficiency and safety of a battery may improve.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electrolyte comprising a block copolymer comprising a co-continuous domain comprising:
   an ion conductive phase and
   a structural phase,
   wherein the structural phase comprises a polymer segment having a glass transition temperature that is equal to or lower than about 25° C.,
   wherein the polymer segment is a polymerization product of:
   i) a monofunctional polymerizable monomer,
   ii) a multifunctional polymerizable monomer, and
   iii) a polymerizable monomer comprising a reactive functional group,
   wherein an amount of the monofunctional polymerizable monomer is in a range of about 0.15 moles to about 0.5 moles based on 1 mole of the total amount of the monofunctional polymerizable monomer, the multifunctional polymerizable monomer, and the polymerizable monomer comprising a reactive functional group,
   wherein an amount of the multifunctional polymerizable monomer is in a range of about 0.05 moles to about 0.3 moles based on 1 mole of the total amount of the monofunctional polymerizable monomer, the multifunctional polymerizable monomer, and the polymerizable monomer comprising a reactive functional group,
   wherein an amount of the polymerizable monomer comprising a reactive functional group is in a range of about 0.2 moles to about 0.7 moles based on 1 mole of the total amount of the monofunctional polymerizable monomer, the multifunctional polymerizable monomer, and the polymerizable monomer comprising a reactive functional group,
   wherein "about" means within ±10% of the stated value, and
   wherein the block copolymer is represented by Formula 1 or Formula 2:

Formula 1

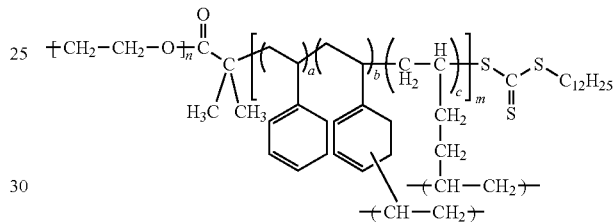

wherein, in Formula 1,
m and n each denotes a degree of polymerization, wherein m is a number selected from about 2 to about 5,000, and n is a number selected from about 2 to about 5,000; and
a, b, and c each denotes a mole fraction, wherein the sum of a, b, and c is 1, and Formula 2

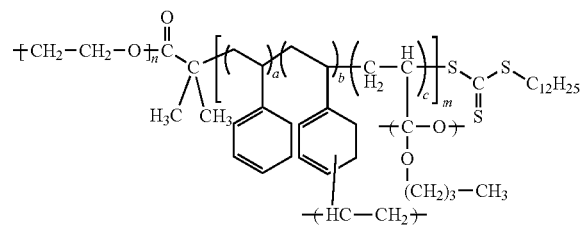

wherein, in Formula 2,
m and n each denotes a degree of polymerization, wherein m is a number selected from about 2 to about 5,000, and n is a number selected from about 2 to about 5,000; and
a, b, and c each denotes a mole fraction, where the sum of a, b, and c is 1.

2. The electrolyte of claim 1, wherein a molar ratio of the monofunctional polymerizable monomer, the multifunctional polymerizable monomer, and the polymerizable monomer comprising a reactive functional group is 4:1:4, 2:1:2, 1:1:4, or 2:1:4.

3. The electrolyte of claim 1 further comprising at least one ionic liquid selected from compounds, wherein each of the compounds comprises:
   i) at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and
ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-(C_2F_5SO_2)(CF_3SO_2)N^-$, and $(CF_3SO_2)_2N^{3\bar{1}}$.

4. The electrolyte of claim 1 further comprising at least one alkali metal salt or alkali earth metal salt selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiN(SO_2C_2F_5)_2$, $LiN(SO_2CF_3)_2$, $LiN(SO_2CF_2CF_3)_2$, $LiPF_3(CF_2CF_3)_3$, $LiPF_3(C_2F_5)_3$, $LiPF_3(CF_3)_3$, $LiB(C_2O_4)_2$, NaSCN, $NaSO_3CF_3$, KTFSI, NaTFSI, $Ba(TFSI)_2$, $Pb(TFSI)_2$, $Ca(TFSI)_2$, and $LiPF_3(CF_2CF_3)_3$.

5. The electrolyte of claim 1 further comprising inorganic particles of at least one inorganic particle selected from $SiO_2$, $TiO_2$, ZnO, $Al_2O_3$, $BaTiO_3$, cage-structured silsesquioxane, and a metal-organic framework (MOF).

6. The electrolyte of claim 1, wherein the ion conductive phase comprises an ion conductive polymer, and the electrolyte comprises a polymerization product of a composition comprising a chain transfer agent containing an ion conductive polymer, a monofunctional polymerizable monomer, a multifunctional polymerizable monomer, and an elasticity-retaining polymerizable monomer comprising a reactive functional group.

7. The electrolyte of claim 1,
wherein a size of the co-continuous domain is about 1 micrometers or greater, and
wherein the structural phase comprises a polymerization product of a composition comprising a monofunctional polymerizable monomer, a multifunctional polymerizable monomer, and an elasticity-retaining polymerizable monomer comprising a reactive functional group, wherein "about" means within ±10% of the stated value.

8. The electrolyte of claim 1 further comprising at least one selected from a liquid electrolyte, a solid electrolyte, a gel electrolyte, a polymer ionic liquid, and a separator.

9. A method of preparing an electrolyte, the method comprising performing polymerization of an electrolyte composition comprising:
a chain transfer agent containing an ion conductive polymer, which is a polymer for forming an ion conductive phase; and
the electrolyte composition comprising:
i) a monofunctional polymerizable monomer,
ii) a multifunctional polymerizable monomer, and
iii) a polymerizable monomer comprising a reactive functional group, which are monomers for forming a structural phase polymer, to obtain the electrolyte of claim 1.

10. The method of claim 9, wherein the electrolyte composition further comprises at least one selected from an ionic liquid, an alkali metal salt, and an alkali earth metal salt, or the at least one selected from an ionic liquid, an alkali metal salt, and an alkali earth metal salt is added to the electrolyte obtained from the polymerization.

11. The method of claim 9, wherein the chain transfer agent containing the ion conductive polymer is prepared by reacting at least one selected from a polyether, an acrylic resin, a methacrylic resin, and a polysiloxane with a chain transfer agent.

12. The method of claim 9, wherein the chain transfer agent is at least one selected from a dithioester, a dithiocarbamate, a trithiocarbonate, and a xanthate.

13. The method of claim 9, wherein the polymerization is performed at a temperature in a range of about 20° C. to about 150° C., wherein "about" means within ±10% of the stated value.

14. A secondary battery comprising:
a cathode,
an anode, and
the electrolyte of claim 1,
wherein the electrolyte is disposed between the cathode and the anode.

15. The secondary battery of claim 14 further comprising at least one selected from a liquid electrolyte, a solid electrolyte, a gel electrolyte, a polymer ionic liquid, an inorganic particle, and a separator.

16. The secondary battery of claim 14, wherein the anode is lithium metal or a lithium metal alloy electrode, and at least one selected from a liquid electrolyte, a solid electrolyte, a gel electrolyte, a polymer ionic liquid, an inorganic particle, and a separator is further disposed between the electrolyte and the cathode.

17. The secondary battery of claim 14, wherein the cathode or the anode comprises a sheet or a film that is at least partially formed on one surface of the cathode or the anode.

\* \* \* \* \*